United States Patent
Kaloroumakis et al.

(10) Patent No.: US 9,832,216 B2
(45) Date of Patent: Nov. 28, 2017

(54) SYSTEM AND METHOD FOR NETWORK DATA CHARACTERIZATION

(71) Applicant: BluVector, Inc., Arlington, VA (US)

(72) Inventors: Peter E. Kaloroumakis, Bowie, MD (US); Michael P. Boyle, Ellicott City, MD (US); Christopher C. Valentino, Stevensville, MD (US)

(73) Assignee: BLUVECTOR, INC., Arlington, VA (US)

( * ) Notice: Subject to any disclaimer, the term of this patent is extended or adjusted under 35 U.S.C. 154(b) by 102 days.

(21) Appl. No.: 14/941,999

(22) Filed: Nov. 16, 2015

(65) Prior Publication Data

US 2016/0149943 A1    May 26, 2016

Related U.S. Application Data

(60) Provisional application No. 62/083,090, filed on Nov. 21, 2014.

(51) Int. Cl.
*H04L 29/06* (2006.01)
*G06N 7/00* (2006.01)
*G06N 99/00* (2010.01)

(52) U.S. Cl.
CPC ......... *H04L 63/1425* (2013.01); *G06N 7/005* (2013.01); *G06N 99/005* (2013.01);
(Continued)

(58) Field of Classification Search
CPC ............. H04L 63/1425; H04L 63/1408; H04L 63/1416; G06N 7/005; G06N 99/005
See application file for complete search history.

(56) References Cited

U.S. PATENT DOCUMENTS 5,675,711 A    10/1997    Kephart et al.
5,912,039 A    6/1999    Brown
(Continued)

OTHER PUBLICATIONS

Weichselbaum, et al., "ANRUBIS: Android Malware Under the Magnifying Glass", Technical Report TR-ISECLAB-0414-001, Jul. 31, 2014 pp. 1-10, XP055244004; http://sartina.github.io/files/papers/andrubis_techreport.pdf.
(Continued)

*Primary Examiner* — Oleg Korsak
(74) *Attorney, Agent, or Firm* — Morris & Kamlay LLP

(57) ABSTRACT

Described herein are embodiments of a system and method for network data characterization and/or classification that overcome the defects of the prior art. These and other advantages are achieved by a method for network data characterization. The method includes receiving network events, wherein at least some of the events include content, converting the received content into data messages, in which at least some of the data messages include the content and metadata describing an event and the content, routing the data messages to a plurality of analyzers based on specified message criteria to which each analyzer subscribes, each of one or more analyzers that received the routed data messages analyzing the content within the data messages in order to characterize the content, in which the one or more analyzers include at least one machine-learning analyzer that classifies the content with a confidence percentage that indicates the probability that the content is malign or the confidence that a prediction that the content is malign is correct, outputting the characterization results of the one or more analyzers, and comparing the output characterization results against a plurality of criteria to determine subsequent action to take based on the characterization results.

20 Claims, 19 Drawing Sheets

(52) U.S. Cl.
CPC ...... *H04L 63/1408* (2013.01); *H04L 63/1416* (2013.01); *H04L 63/0263* (2013.01)

(56) References Cited

U.S. PATENT DOCUMENTS

| | | | |
|---|---|---|---|
| 6,141,241 | A | 10/2000 | Ovshinsky et al. |
| 7,065,657 | B1 | 6/2006 | Moran |
| 7,072,876 | B1 | 7/2006 | Michael |
| 7,448,084 | B1 | 11/2008 | Apap et al. |
| 7,487,544 | B2 | 2/2009 | Schultz et al. |
| 7,519,998 | B2 | 4/2009 | Cai et al. |
| 7,979,907 | B2 | 7/2011 | Schultz et al. |
| 8,015,284 | B1 | 9/2011 | Isenberg et al. |
| 8,037,535 | B2 | 10/2011 | Maloof |
| RE43,103 | E | 1/2012 | Rozman et al. |
| 8,099,785 | B1 | 1/2012 | Pavlyushchik |
| 8,104,090 | B1 | 1/2012 | Pavlyushchik |
| 8,161,548 | B1 | 4/2012 | Wan |
| 8,171,551 | B2 | 5/2012 | Muttik et al. |
| 8,181,247 | B1 | 5/2012 | Pavlyushchik et al. |
| 8,190,647 | B1 | 5/2012 | Pereira et al. |
| 8,250,655 | B1 | 8/2012 | Malanov et al. |
| 8,341,745 | B1 | 12/2012 | Chau et al. |
| 8,401,982 | B1 | 3/2013 | Satish et al. |
| 8,413,235 | B1 | 4/2013 | Chen et al. |
| 8,413,244 | B1 | 4/2013 | Nachenberg |
| 8,448,218 | B2 | 5/2013 | Bori |
| 8,453,242 | B2 | 5/2013 | Chandnani |
| 8,478,708 | B1 | 7/2013 | Larcom |
| 8,521,667 | B2 | 8/2013 | Zhu et al. |
| 8,555,388 | B1 | 10/2013 | Wang et al. |
| 8,561,180 | B1 | 10/2013 | Nachenberg |
| 8,561,195 | B1 | 10/2013 | Chen et al. |
| 8,561,196 | B1 | 10/2013 | Viljoen et al. |
| 8,578,497 | B2 | 11/2013 | Antonakakis et al. |
| 8,584,241 | B1 | 11/2013 | Jenks et al. |
| 8,590,045 | B2 | 11/2013 | Niemela et al. |
| 8,627,469 | B1 | 1/2014 | Chen et al. |
| 8,635,171 | B1 | 1/2014 | Kennedy |
| 8,667,593 | B1 | 3/2014 | Shnitzer |
| 8,682,812 | B1 | 3/2014 | Ranjan |
| 8,683,585 | B1 | 3/2014 | Chen et al. |
| 8,719,924 | B1 | 5/2014 | Williamson et al. |
| 8,726,388 | B2 | 5/2014 | Turbin |
| 8,745,760 | B2 | 6/2014 | Poulson |
| 8,769,678 | B2 | 7/2014 | Dubrovsky et al. |
| 8,799,190 | B2 | 8/2014 | Stokes et al. |
| 8,826,431 | B2 | 9/2014 | Pereira et al. |
| 8,832,829 | B2 | 9/2014 | Manni et al. |
| 8,838,992 | B1 | 9/2014 | Zhu et al. |
| 8,875,294 | B2 | 10/2014 | Golavanov |
| 2003/0065926 | A1 | 4/2003 | Schultz et al. |
| 2003/0074573 | A1 | 4/2003 | Hursey |
| 2003/0131256 | A1 | 7/2003 | Ackroyd |
| 2005/0015606 | A1 | 1/2005 | Blamires et al. |
| 2005/0021994 | A1 | 1/2005 | Barton et al. |
| 2005/0027686 | A1 | 2/2005 | Shipp |
| 2005/0262567 | A1 | 11/2005 | Carmona |
| 2006/0037080 | A1 | 2/2006 | Maloof |
| 2006/0095971 | A1 | 5/2006 | Costea et al. |
| 2007/0039052 | A1 | 2/2007 | Chandnani |
| 2007/0100905 | A1 | 5/2007 | Masters et al. |
| 2007/0168547 | A1 | 7/2007 | Krywaniuk |
| 2007/0169194 | A1 | 7/2007 | Church et al. |
| 2007/0169195 | A1 | 7/2007 | Anand et al. |
| 2007/0174270 | A1 | 7/2007 | Goodwin et al. |
| 2007/0174911 | A1 | 7/2007 | Kronenberg et al. |
| 2007/0240221 | A1 | 10/2007 | Tuvell et al. |
| 2007/0266421 | A1 | 11/2007 | Vaidya et al. |
| 2007/0277241 | A1 | 11/2007 | Repasi et al. |
| 2008/0016570 | A1 | 1/2008 | Capalik |
| 2008/0047012 | A1 | 2/2008 | Rubin et al. |
| 2008/0127336 | A1 | 5/2008 | Sun et al. |
| 2008/0141371 | A1 | 6/2008 | Bradicich et al. |
| 2008/0177680 | A1 | 7/2008 | Laxman et al. |
| 2008/0177684 | A1 | 7/2008 | Laxman et al. |
| 2008/0201778 | A1 | 8/2008 | Guo et al. |
| 2008/0201779 | A1 | 8/2008 | Tahan et al. |
| 2008/0263669 | A1 | 10/2008 | Alme |
| 2009/0013405 | A1 | 1/2009 | Schipka |
| 2009/0094175 | A1 | 4/2009 | Provos et al. |
| 2009/0172979 | A1 | 7/2009 | Lunde |
| 2009/0241194 | A1 | 9/2009 | Thomas |
| 2009/0300765 | A1 | 12/2009 | Moskovitch et al. |
| 2009/0313700 | A1 | 12/2009 | Horne |
| 2010/0064369 | A1 | 3/2010 | Stolfo et al. |
| 2010/0077479 | A1 | 3/2010 | Viljoen |
| 2010/0154063 | A1 | 6/2010 | Hutton et al. |
| 2010/0162395 | A1 | 6/2010 | Kennedy |
| 2010/0180344 | A1 | 7/2010 | Malyshev et al. |
| 2010/0192222 | A1 | 7/2010 | Stokes et al. |
| 2010/0229239 | A1 | 9/2010 | Rozenberg et al. |
| 2011/0004935 | A1 | 1/2011 | Moffie et al. |
| 2011/0162070 | A1 | 6/2011 | Krasser et al. |
| 2012/0084859 | A1 | 4/2012 | Radinsky et al. |
| 2012/0096549 | A1 | 4/2012 | Amini et al. |
| 2012/0158626 | A1 | 6/2012 | Zhu et al. |
| 2012/0260342 | A1 | 10/2012 | Dube et al. |
| 2013/0198841 | A1 | 8/2013 | Poulson |
| 2013/0291111 | A1 | 10/2013 | Zhou et al. |
| 2013/0326625 | A1 | 12/2013 | Anderson et al. |
| 2014/0123290 | A1 | 5/2014 | Li et al. |
| 2014/0150105 | A1 | 5/2014 | Yu |
| 2014/0181973 | A1 | 6/2014 | Lee et al. |
| 2014/0298460 | A1 | 10/2014 | Xue et al. |

OTHER PUBLICATIONS

International Search Report for PCT Application No. PCT/US2015/060820 dated Jan. 29, 2016.
Learning to Detect and Classify Malicious Executables in the Wild, Journal of Machine Learning Research 7 (Dec. 2006) pp. 2721-2724, J. Zico Kolter et al.
Selecting Features to Classify Malware, 2012 Adobe Systems Incorporated, Kathik Raman, Security Researcher, Adobe PSIRT. Due to size of this non patent literature, it was uploaded as two parts (Part 1 and Part 2).

| TIMESTAMP | DESTINATION PORT | SOURCE IP | SOURCE PORT | HOST | INTEL | STATUS | ANALYSIS |
|---|---|---|---|---|---|---|---|
| 2014-11-08 06:39:22 | 1139 | 199.42.115.244 | 80 | THEKAKSOSAT.INFO | — | | |
| 2014-11-08 06:39:22 | 1153 | 199.42.115.244 | 80 | THEKAKSOSAT.INFO | — | | |
| 2014-11-08 06:39:22 | 1113 | 203.100.26.238 | 80 | ABLESITE.INFO | — | | |
| 2014-11-08 06:39:22 | 1164 | 221.58.205.189 | 80 | KAKSOSATBLOG.INFO | — | | |
| 2014-11-08 06:39:22 | 1134 | 221.58.205.189 | 80 | KAKSOSATBLOG.INFO | — | | |
| 2014-11-08 06:39:22 | 1148 | 222.122.251.177 | 80 | ABLENOW.INFO | — | | |
| 2014-11-08 06:39:22 | 1124 | 222.122.251.177 | 80 | ABLENOW.INFO | — | | UPDATE...EXE |
| 2014-11-08 06:39:22 | 1113 | 222.122.251.177 | 80 | ABLEBLOG.INFO | — | | |
| 2014-11-08 06:39:22 | 1060 | 217.220.100.149 | 80 | ABSINTHIAL.INFO | — | | |
| 2014-11-08 06:39:22 | 1105 | 60.7.93.137 | 80 | BASESRV.NET | — | | UPDATE...EXE |
| 2014-11-08 06:39:22 | 1103 | 60.7.93.137 | 80 | BASESRV.NET | — | | |
| 2014-11-08 06:39:22 | 1098 | 92.62.101.129 | 80 | — | — | | |

FIG. 9E

| TIMESTAMP | DESTINATION PORT | SOURCE IP | SOURCE PORT | HOST | INTEL | STATUS | ANALYSIS |
|---|---|---|---|---|---|---|---|
| 2014-11-08 06:39:22 | 1139 | 199.42.115.244 | 80 | THEKAKSOSAT.INFO | – | | |
| 2014-11-08 06:39:22 | 1153 | 199.42.115.244 | 80 | THEKAKSOSAT.INFO | – | | |
| 2014-11-08 06:39:22 | 1113 | 203.100.26.238 | 80 | ABLESITE.INFO | – | | |
| 2014-11-08 06:39:22 | 1164 | 221.58.205.189 | 80 | KAKSOSATBLOG.INFO | – | | |
| 2014-11-08 06:39:22 | 1134 | 221.58.205.189 | 80 | KAKSOSATBLOG.INFO | – | | |
| 2014-11-08 06:39:22 | 1148 | 222.122.251.177 | 80 | ABLENOW.INFO | – | | UPDATE...EXE |
| 2014-11-08 06:39:22 | 1124 | 222.122.251.177 | 80 | ABLENOW.INFO | – | | UPDATE...EXE |
| 2014-11-08 06:39:22 | 1113 | 217.220.100.149 | 80 | ABSINTHIAL.INFO | – | | |
| 2014-11-08 06:39:22 | 1060 | 60.7.93.137 | 80 | ABLEBLOG.INFO | – | | |
| 2014-11-08 06:39:22 | 1105 | 60.7.93.137 | 80 | BASESRV.NET | – | | |
| 2014-11-08 06:39:22 | 1103 | 60.7.93.137 | 80 | BASESRV.NET | – | | |
| 2014-11-08 06:39:22 | 1098 | 92.62.101.129 | 80 | – | | | |

GROUP BY:
- FILES.ANALYSIS.PESCANNER.RESULT.RESOURCES.LANG
- META.APP
- META.HOST
- FILES.FLAGS

FILES.ANALYSIS.PESCANNER.RESULT.RESOURCES.LANG / META.APP / META.HOST / FILES.FLAGS

| | | ? | ✗ | | | |
|---|---|---|---|---|---|---|
| + LANG_ENGLISH | 1102 | 1332 | 499 | 40 | 0 | |
| + LANG_NEUTRAL | 0 | 0 | 232 | 44 | 0 | |
| + LANG_RUSSIAN | 0 | 0 | 21 | 16 | 0 | |
| + LANG_CHINESE | 0 | 0 | 0 | 231 | 0 | |

SYSTEM AND METHOD FOR NETWORK DATA CHARACTERIZATION

RELATED APPLICATIONS

This application claims priority of U.S. Provisional Application Ser. No. 62/083,090, entitled "SYSTEM AND METHOD FOR NETWORK CHARACTERIZATION," and herein incorporated by reference in its entirety.

BACKGROUND

In 2014, a sample of fifty (50) worldwide organizations reported 1,367 data breach events among more than 63,437 network security incidents. These data breaches represent successful cyber-attacks that circumvented, penetrated, or otherwise went unnoticed by organizations with significant existing investments in network security hardware and software. Most are conducted by external parties to the victim organization using malware or hacking techniques, take months to discover, and are typically reported to the victim by a third party. The companies were not "soft targets." They employed common network security devices and best governance practices.

The current suite of network security products such as firewalls, intrusion prevention systems (IPS), anti-virus software, policy enforcement tools, configuration management tools, and data loss prevention (DLP) systems play a vital role in implementing a defense-in-depth approach to network security. Such security products are capable of blocking much of the lower end malicious activity in the wild when properly used. Indeed, these security products play an important role in breach remediation by providing an existing framework to remove malware from affected systems once it has been discovered and fingerprinted. Yet, these products/tools are lacking in two fundamental areas:

1. Each tool requires additional hardware and software resources and custom integration negating available efficiencies in system overlap.
2. Detection is too slow and limited to previously observed malware/threat actors and such tools are, therefore, ineffective against the more modern threats.

In the first area, traditional defense tools (e.g., IPS/IDS, policy enforcement, CM, DLP, etc.) and more advanced intelligence analysis tools overlap in core functionality for stream assembly, content extraction, data tagging, association, and workflow integration. However, without the ability to leverage this overlap, data integration requires custom implementation resources. A platform is needed to empower multi-faceted analysis leveraging these core capabilities while providing seamless integration with threat intelligence feeds, stand-alone components, and SIEM tools.

In the second area, today's malware detection engines are tuned for certainty. Signatures are written specifically to hit on the malicious software for which they are designed. To address the shortcoming of signature-based systems, defenders are now using sandboxes—carefully controlled virtual environments to execute and examine the behavior of suspect files. While more resilient to changes in malware relative to signatures, sandboxes are simply too slow to keep up with tremendous volume of enterprise network traffic. Since each file can take several minutes to examine, these systems must use pre-filters to decide which files to look at while allowing the rest to pass unexamined. It is typically too costly to build a sandbox large enough to examine all traffic. Pre-filters are little more than signature-based detection mechanisms where the signatures are related to the file metadata or behavioral patterns in the network environment. A pre-filter might look for an emailed file from someone outside the enterprise with a URL linking to the file. These behavioral patterns are just as fragile as signatures and require previous, repeated observation of the behavior. Only a small subset of potential malware is inspected and many potential threats continue untouched.

Even if new malware were to be selected for analysis, most sandbox environments only look for previously observed malicious activity such as changes to the Windows registry. Authors of new malware understand sandbox detectors and have simple methods for evading detection including having the malware sleep for minutes before executing, detecting sandbox network settings, mimicking benign execution, and designing for highly specific computing configurations that sandboxes do not replicate. Both approaches attempt to mitigate their fragile design through broad-based reporting and sharing of malicious signatures. These techniques leave defenders chasing the threat and offer no path to proactive and predictive defense. Existing solutions are too slow and ineffective against the modern threat.

A paradigm shift is needed. Proactive search and discovery of threats using real time non-signature based techniques must supplement antiquated signature and behavior based techniques. Automated identification of threats must reduce the discovery timeline from months to minutes. Defenders must head off an attack before it occurs rather than waiting for someone outside their organization to alert them of a breach.

SUMMARY

Described herein are embodiments of a system and method for network data characterization and/or classification that overcome the defects of the prior art. These and other advantages are achieved by a method, and corresponding system, for network data characterization. The method includes receiving network events, wherein at least some of the events include content, converting the received content into data messages, in which at least some of the data messages include the content and metadata describing an event and the content, routing the data messages to a plurality of analyzers based on specified message criteria to which each analyzer subscribes, each of one or more analyzers that received the routed data messages analyzing the content within the data messages in order to characterize the content, in which the one or more analyzers include at least one machine-learning analyzer that classifies the content with a confidence percentage that indicates the probability that the content is malign or the confidence that a prediction that the content is malign is correct, outputting the characterization results of the one or more analyzers, and comparing the output characterization results against a plurality of criteria to determine subsequent action to take based on the characterization results.

These and other advantages are also achieved by a system for network data characterization. The system includes one or more characterization sensors that include one or more processors and memory, in which the memory includes instructions for execution by the one or more processors for receiving network events, in which at least some of the events include content, converting the received content into data messages, in which at least some of the data messages include the content and metadata describing an event and the content, routing the data messages to a plurality of analyzers based on specified message criteria to which each analyzer subscribes, each of one or more machine-learning analyzers that received the routed data messages analyzing the content within the data messages in order to characterize the content, in which the one or more machine-learning analyzers include at least one machine-learning analyzer that classifies the content with a confidence percentage that indicates the probability that the content is malign or the confidence that a prediction that the content is malign is correct, outputting the characterization results of the one or more machine-learning analyzers and comparing the output characterization results against a plurality of criteria to determine subsequent action to take based on the characterization results. The characterization sensors may be specially-programmed computers dedicated to performing the tasks described.

BRIEF DESCRIPTION OF THE DRAWINGS

Embodiments of a system and method for network data characterization and/or classification are understood and described in conjunction with the following drawings, wherein:

FIGS. 7A-7B are screen-shots of a classified file illustrating characterization results of an embodiment of a system and method for network data characterization.

FIG. 8 is a screen-shot of a rule-setting interface for applying rules to results of an embodiment of a system and method for network data characterization.

FIGS. 9A-9E are screen-shots of a classified event listing with a pinpoint tools illustrating pinpointed and filtered characterization results of an embodiment of a system and method for network data characterization.

DETAILED DESCRIPTION

Described herein are embodiments of a system and method for network data characterization and/or classification. Embodiments may be considered to characterize or classify network content received, including whether the content is malicious, suspicious or benign/trusted. Embodiments include a sophisticated, open cyber intelligence platform that automatically detects, analyzes and expedites responses to advanced threats. The platform is capable of handling the most demanding network environments, sifting through massive amounts of data and utilizing high-accuracy, non-brittle, resilient analytics to find malware existing network security tools would miss. Embodiments of the platform implement machine-learning techniques to protect enterprise assets and easily integrate with existing cyber security tools. The platform may be scaled to defend large enterprises without requiring excess hardware. Embodiments perform at line rate in near real-time. The cyber intelligence platform allows cyber security administrators to dynamically adjust analyst work-load and threat-detection thresholds while allowing analysts to inspect and correlate individual events to integrated, real-time intelligence providers for greater event context.

Embodiments of a system and method for network data characterization use a novel proactive approach to achieve high malware detection accuracy at up to ten (10) Gbps line speeds on a single 2U appliance with very low latency. Embodiments do not rely solely on signatures or other static threat characteristics. Rather, the use of machine-learning and other advanced techniques implemented has described here are effective against modern, rapidly changing threats. The cyber-intelligence platform provides a file analysis framework, streaming analytics ("cyber time") for near real-time workflow integration, real-time intelligence correlation, post analyzers for additional content processing, and user-definable output event routing for system integration. Embodiments enhance intelligence analysis by working in concert with other technologies, easily interfacing with intelligence feeds, analysis tools, and SIEM consoles.

New technical capabilities of embodiments of a system and method for network data characterization include:

1. A cyber intelligence platform with a line rate file analysis framework, real-time threat-intelligence feed correlation, post analyzers for additional content processing, and user-definable output routing for system integration; and 2. A suite of platform-hosted analytics providing resilient, robust, accurate, high-speed malware detection; including an innovative machine learning based analytic.

Figure 1A:
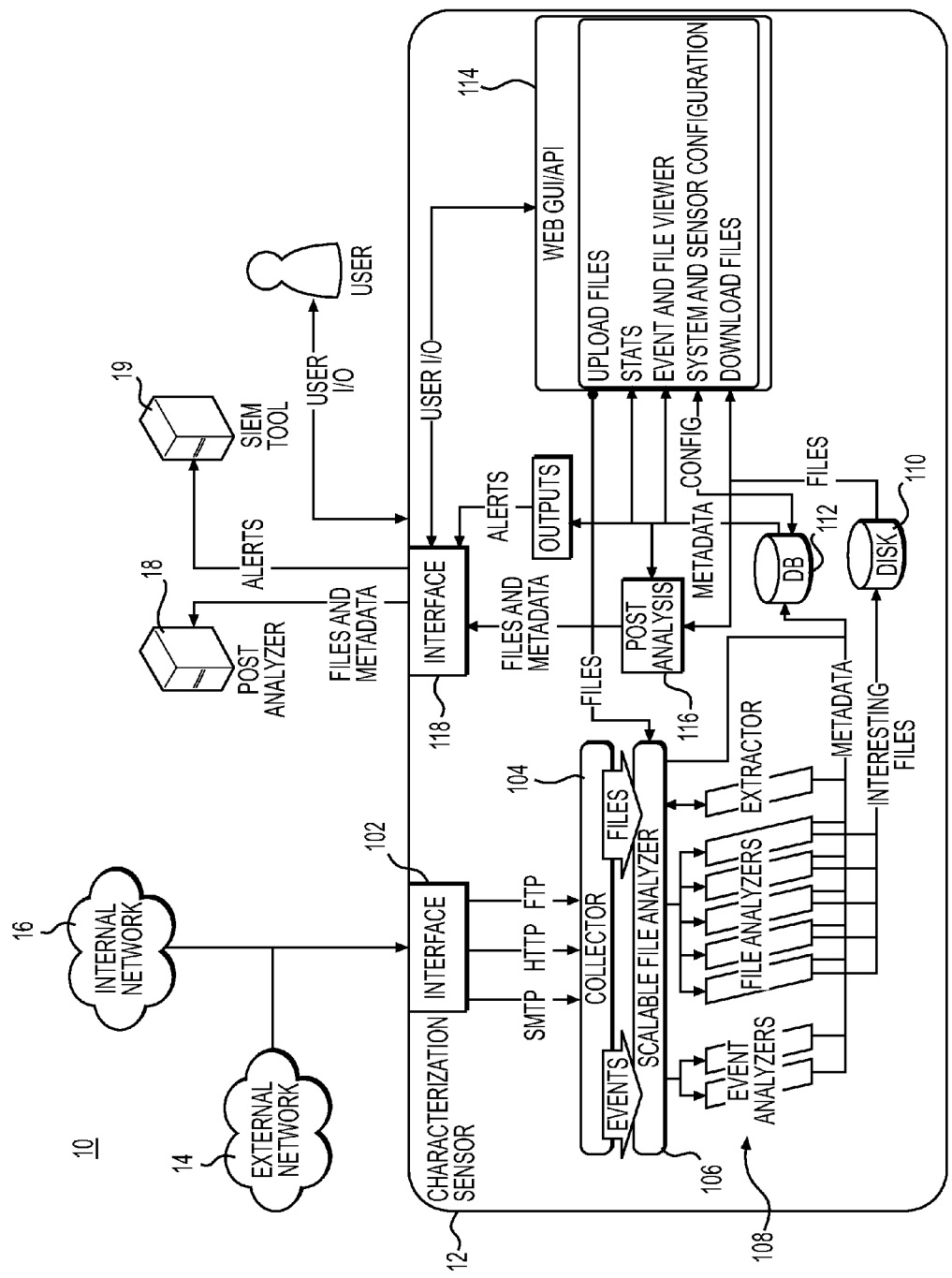
FIG. 1A is a block diagram illustrating an embodiment of a system for network data characterization.

With reference now to FIG. 1A, shown is an embodiment of a system 10 for network data characterization. Illustrated is a software architecture of characterization or classification sensor 12 provided by system 10. In characterization sensor 12, collector subsystem 104 is the data entry point, receiving network events from external networks 14 and internal network 16 through interface 102. Interface 102 may be any of a variety of network interfaces having a variety of speeds (e.g., a 1G or 10G interface). Network events may include content, e.g., files. Collector 104 may be a re-assembler that reassembles data from feeds (e.g., SMTP, HTMP and FTP feeds) into events and content (e.g., files). In embodiments, collector 104 may utilize a deep packet inspection framework to provide content and metadata regarding the events from which the content derived to scalable file analyzer 106. In embodiments, collector 104 creates messages from content and metadata and transmits the messages to scalable file analyzer 106. In other embodiments, scalable file analyzer 106 creates the messages from the content and metadata transmitted from collector 104. Embodiments may include a graphic user interface (GUI) and/or command-line interface (CLI)-based collector for manual file upload and analysis and a file-based API collector for external file analysis.

In an embodiment, collector subsystem 104 feeds a file analysis framework (scalable file analyzer 106) that hosts a suite of in-memory analyzers (analytics). In an embodiment, scalable file analyzer 106 includes a plurality of event and file analyzers 108. For example, in the implementation shown, scalable file analyzer 106 hosts seven (7) types of event and file analyzers 108. Some analyzers 108 may be event analyzers, some may be file analyzers, some may be considered both event and file analyzers. Based on load and other factors, embodiments may include one or more event and file analyzers of each type. In embodiments, analyzers 108 receive the messages transmitted to or by scalable file analyzer 106 (depending on whether collector 104 or scalable file analyzer 106 creates the messages) on a subscription basis. For example, each analyzer 108 may subscribe to only certain types of content (e.g., certain types of files, content received from certain types of sources or content received over certain types of networks). Analyzers 108 and the analytics implemented by analyzers 108 are described in detail below.

When receiving messages from collector 104, scalable file analyzer 106 may determine which analyzer(s) 108 subscribes to the content in each message and only rout the messages with subscribed content to the subscribing analyzer(s) 108. In other words, messages (content and metadata) are routed to an analyzer 108 based on whether the messages contain content to which the event or file analyzer 108 subscribes. For example, some analyzers, such as the Hector analyzer described below, may subscribe to content containing PE32s, PDF, MS-DOS executables, MS Word, PowerPoint, Excel, CDF/MSI, Android APK, JAR, ELF, Windows Installer XML, Bitmap, and GIF files. Other analyzers may only subscribe to a subset of this content (e.g., only PE32 and MS-DOS files). Scalable file analyzer 106 may determine whether the content in a message is subscribed to by the metadata contained within the message. Likewise, scalable file analyzer 106 may maintain a file or other data with the subscriptions of each analyzer 108. Alternatively, such file or data may be maintained by the analyzers 108 and examined by the scalable file analyzer 106. It is noted that multiple analyzers 108 may subscribe to the same type of content, while some content is only subscribed to by a single analyzer 108; consequently, the subscriptions of one or more analyzers 108 may overlap with the subscriptions of one or more other analyzers 108.

With continuing reference to FIG. 1A, results output from scalable file analyzer 106 may be stored on a disk(s) 110 and in a database(s) 112. For example, analyzer 106 may output tagged, classified files (e.g., classified as malign or with a confidence of being malign above configured threshold percentage) may be stored on disk(s) 110 while metadata described results of analysis from analyzer 106 may be stored in database(s) 112. Disk(s) 110 a Analyzer 106 results may be viewed in a GUI viewer 114 that allows custom filtering on a large set of content and session metadata. GUI event viewer 114 may notify the user of the analyzer(s) 108 that hit on a file based on an detection threshold configuration (e.g., either pre-loaded or user-defined) and may provide workflow for a collaborative analysis group to tag items as UNKNOWN, TRUSTED (benign), SUSPICIOUS, or MALICIOUS, as described in detail below.

Scalable file analyzer 106 results may also be configured to correlate with threat intelligence feeds, output to user definable systems for interoperability and scalability, or workflows can route files to post-analyzers 18 for additional analysis. Post-analysis sub-system 116 may retrieve tagged, classified files from disk 112 and output through interface 118 to post-analyzer(s) 18. Interface 118 may be any of a variety of network interfaces having a variety of speeds (e.g., 1G MGMT interface). Metadata output from analyzer 106 may also be retrieved by output subsystem 120 and externally output through interface 118 to other tools, such as security information and event management (SIEM) tool 19. An open approach and technologies may apply to intelligence community integration. Embodiments of system 10 also provide dashboards showing a snapshot of data routing weighted by workload, overall analysis status, and trending files, hosts, and hits.

An analytic approach or embodiments is to:

1. Embrace (not prevent or re-implement) analyst-preferred tools and enable them to run cooperatively at network gateways for earlier identification and meta-analytic awareness.

2. Deliver novel new analytics to compliment current capabilities by providing resilient, accurate, high-speed malware detection.

With continuing reference to FIG. 1A, an embodiment of system 10 for network data characterization hosts seven (7) user-configurable analyzers 108. Table 1 below provides a listing of analyzers 108 hosted in an embodiment of system 10.

| Analyzer | Description |
| --- | --- |
| Hector | Highly configurable machine learning based Analyzer for detection of previously unseen malware |
| hURl | Machine Learning approach to suspicious URL characterization |
| ClamAV | Signature based Analyzer for malware detection |
| Extractor | Password cracker Analyzer for encrypted archive files |
| PEScanner | Portable executable Analyzer for PE32 and MS-DOS |
| YARA | Rule based, pattern matching Analyzer for malware detection |
| Intel Lookup | Intel correlation Analyzer for subscribed processes |

Hector is a predictive, machine-learning proprietary analyzer that utilizes highly-configurable machine learning predictive techniques to detect previously unseen malware, utilizing feature-based analysis and characterization to detect malware and classify or characterize content with a percentage indicating a likelihood that the content is malicious (i.e., a confidence percentage indicating the confidence that the file is malicious). Embodiments of Hector and processes used by embodiments of Hector are described in pending U.S. patent application, entitled "Improved System and Method for Automated Machine-Learning, Zero-Day Malware Detection," Ser. No. 14/038,682, which is hereby incorporated in its entirety by reference. Embodiments of the Hector analyzer may use a feature-based algorithm or process to determine whether content is malicious, outputting a confidence percentage that a file is malicious based on a comparison of features derived from the file and a classifier built from features of known malicious files and known benign files. Embodiments may also host a hURI proprietary analyzer that utilizes highly-configurable machine learning techniques to classify URLs as, e.g., suspicious, clean or dirty. The hURI sensor may classify URLs based on a semantic analysis of the domain name.

Embodiments may also host third-party or open-source tools for network data characterization. For example, embodiments of system 10 may host a signature-based analyzer for malware detection, such as ClamAV. Embodiments of system 10 may host a password-cracker analyzer for encrypted archive file analysis and characterization, such as Extractor. Embodiments of system 10 may host a portable executable analyzer for analysis and characterization of PE32 and MS-DOS executables, such as PEScanner. Embodiments of system 10 may host a rule-based, pattern matching analyzer for malware detection and characterization, such as YARA. Likewise, embodiments of system 10 may host an Intel correlation analyzer for subscribed processes, such as Intel Lookup. These and other analyzers, may be hosted by embodiments of system 10.

Machine Learning: Automated Search and Discovery

With continued reference to FIG. 1A and Table 1, machine learning, such as used by Hector and hURI, is used to train computers to distinguish between objects of different types, or classes, through exposure to various example objects and has been successfully applied in many fields such as facial recognition, voice recognition, and image processing. A key step is the selection of object features to be used in learning the differences between the classes. The result of the learning process is called a classifier. Classifiers allow computers to predict the class of an object they have never seen before and can therefore be used to search for objects of similar type. Due to the automation of machine learning algorithms, there is a tremendous reduction in time needed to investigate the entire object space.

For example, in embodiments of Hector used in embodiments of a system and method for network data characterization, machine learning is applied to build software classifiers based on a complex combination of features to distinguish malware from benign software, and search massive volumes of traffic. Embodiments of a system and method for network data characterization inspect network traffic and human analysts are tipped to inspect high probability events. This approach has distinct advantages over signature and sandbox based approaches. First, the approach utilized in Hector by embodiments described herein scales to very high volumes of traffic such that everything, i.e., all or virtually all network traffic, can be inspected. No pre-filter or other form of upstream thinning is required. Second, unlike signatures or behaviors, Hector classifiers are resilient to changing malware and tactics. It has been demonstrated that the classifiers can discover threats years after the threats have changed. This increases probability of detection and accuracy. Embodiments of Hector supports analysis of the following file types: PE32s, PDF, MS-DOS executables, MS Word, PowerPoint, Excel, CDF/MSI, Android APK, JAR, ELF, Windows Installer XML, Bitmap, and GIF.

It is noted that competitor malware detection tools rely on information indicating previously detected malware. These tools create and update hashes that indicate whether files are previously detected malware. The problem with this paradigm is that it relies on previous detection of the malware being reported to the malware detection tool. Therefore, it can take days, weeks, months before malware is detected and included in the detection tool. Such tools also only analyze the files that match their hash and necessarily let pass malware that has not previously been detected. Embodiments described herein that utilize Hector and other machine learning techniques do not care about a hash and detect malware in near real time. The embodiments described herein also analyze every file received, not just files matching the hash. Furthermore, embodiments may analyze all files received, something that cannot be practically done with current sandboxing tools.

With continued reference to FIG. 1A, characterization sensor 12 may be implemented as a single container physical appliance (i.e., one (1) box). Characterization sensor 12 may be implemented as a 2U x86-based appliance with 256 GB memory. In an embodiment, characterization sensor 12 has two (2) 1 Gbps RJ45 management network interface cards (NICs) and two (2) to six (6) 10 Gbps SFP+ high end data processing NICs. Characterization sensor 12 may runs on hardened CentOS and is managed using encrypted and signed RPMs. Characterization sensor may be implemented on multiple x86-based, other processor based, appliances, e.g., a stack of bladed servers.

Interoperability: Interoperability of embodiments described herein may be provided through open standards-based interfaces. For example, embodiments provide RESTful API services and expose data in syslog, Common Event Format (CEF), JSON, XML, and other standards. Embodiments implement the Trusted Automated eXchange of Indicator Information (TAXII) and consumption of other Structured Treat Information Exchange (STIX) standards. Extracted files may be published to interoperate in a broader analysis ecosystem.

Figure 1B:
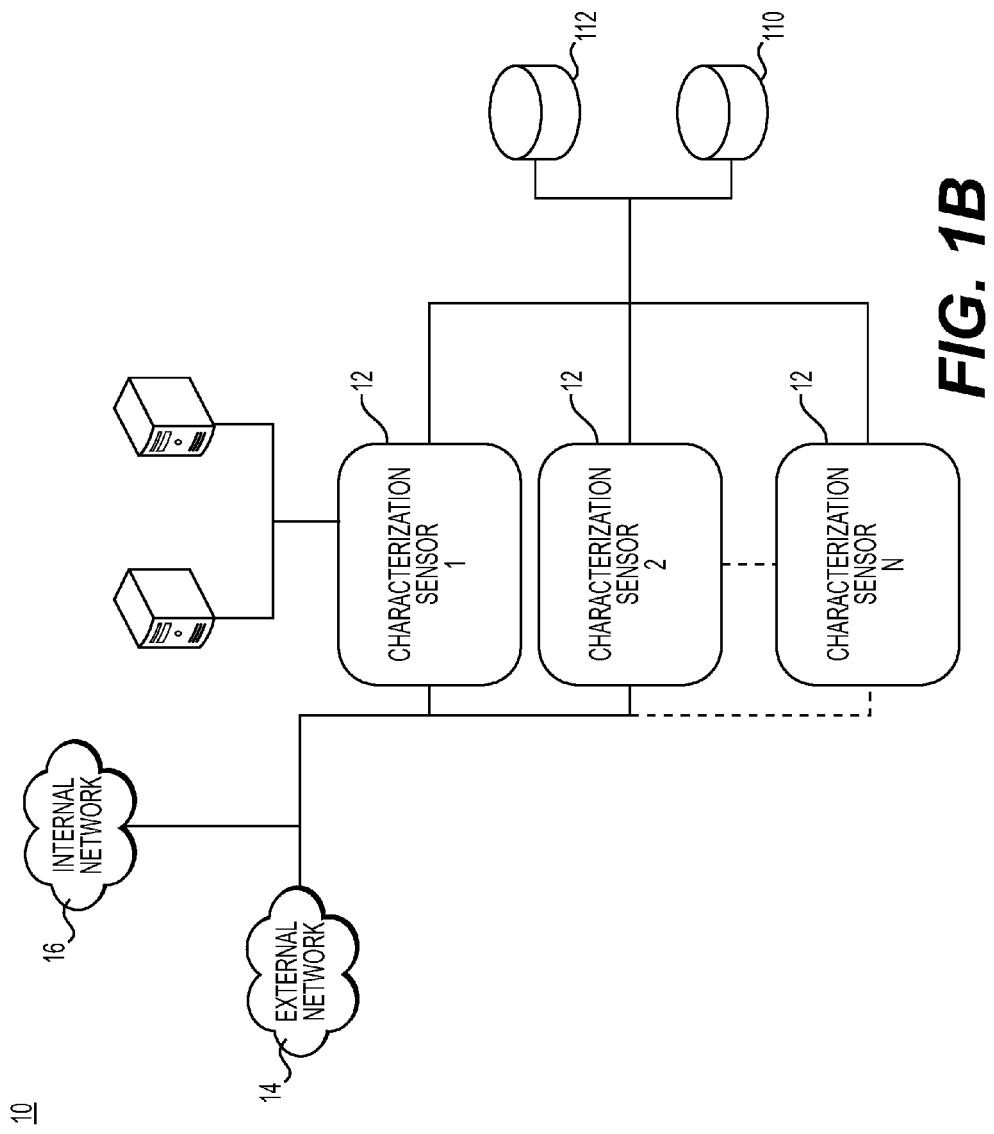
FIG. 1B is a block diagram illustrating an embodiment of a system for network data characterization.

Scalability: Embodiments may be scaled to higher than 10 Gbps data rates through standard load balancing techniques. Much less hardware is required than scaling sandboxes based approaches due to the reduction in required processing for the machine learning approach. With reference now to FIG. 1B, shown is another embodiment of a system 10 for network data characterization. As shown, embodiments of system 10, may implement a data grid approach to management that includes a plurality of characterization sensors 12 in which the characterization sensors 12 are arranged in a peer-to-peer mesh. In the data grid shown, each data characterization sensor 12 shares non-volatile state in a robust and transactional fashion thereby removing a central manager, providing data and configuration redundancy, and simplifying the overall administration and architecture. In this manner multiple characterization sensors 12 are connected to each other in a peer-to-peer mesh, called the data grid, where each characterization sensor 12 provides resiliency and redundancy for other sensors 12. In such an arrangement, the characterization sensors 12 may share disk(s) 110 and database(s) 112. Alternatively, each characterization sensor 12 may internally maintain duplicate storage on internal disk(s) 110 and database(s) 112 (not shown in FIG. 1B). In this manner a mini-cloud of characterization sensors 12 is implemented so that if one characterization sensor 12 is goes off-line, it may be replaced based on the other characterization sensors 12 that have redundant settings and data.

Performance: Embodiments are designed to operate on 1 and 10 Gbps network links Embodiments may be purpose built for in-memory analysis of diverse protocols and voluminous web traffic on high speed gateway links. This enables the collection of up to one thousand objects per second, a typical amount of traffic on an enterprise gateway for web and email protocols.

Security: Embodiments may managed as encrypted RPM package managers (RPMs) on a hardened CentOS platform leveraging a trusted platform module (TPM) module supporting hard disk encryption.

Figure 2:
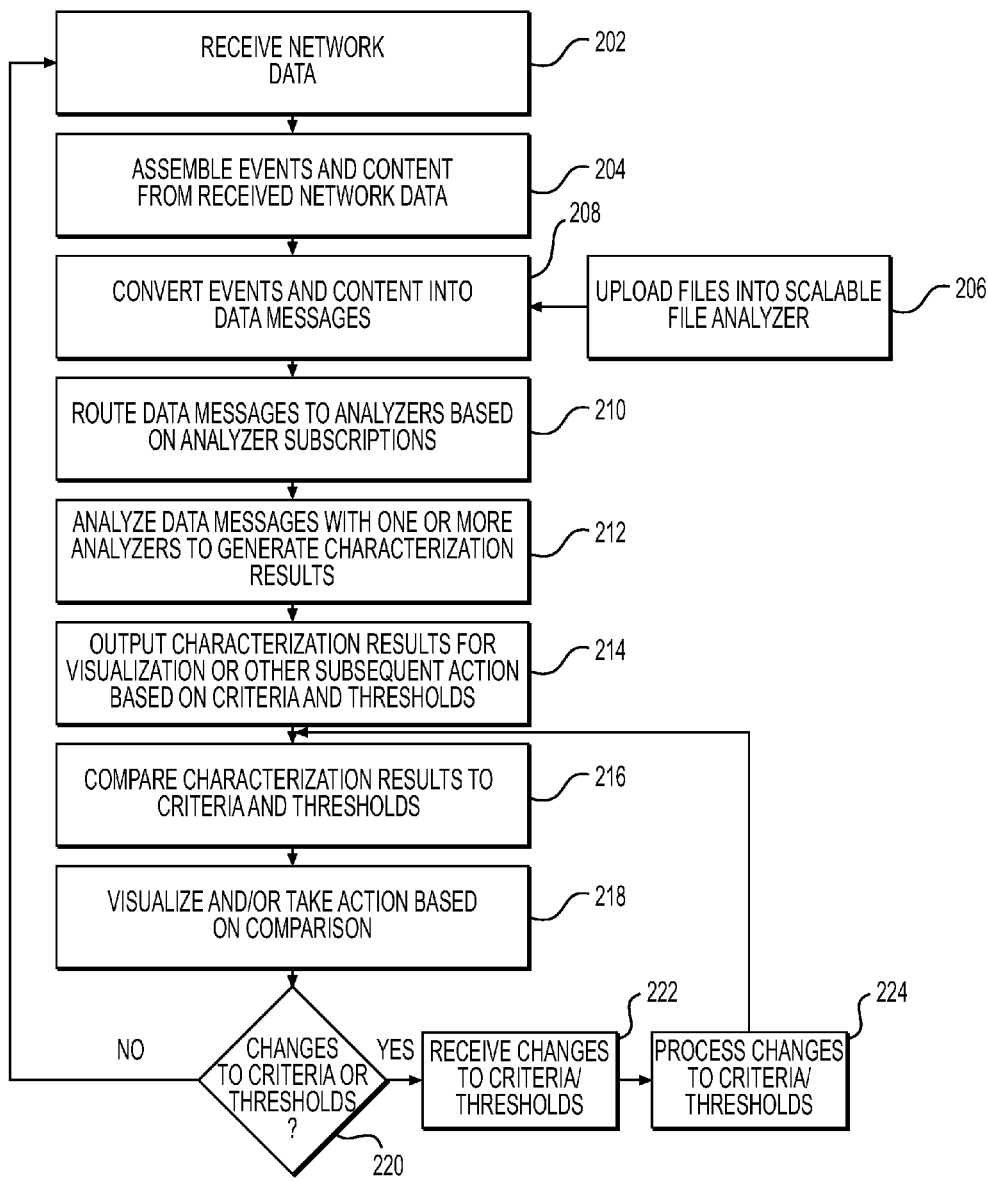
FIG. 2 is a flowchart illustrating an embodiment of a method for network data characterization.

With reference now to FIG. 2, shown an embodiment of a method 20 for network data characterization. Method 20 may be implemented by systems including characterization sensors as described herein, e.g., with reference to FIGS. 1A-1B. Method 20 receives network data, block 202. As described above, characterization sensor 12 may receive network data (e.g., events) through an interface that connects to external network(s) 14 and/or internal networks 16. Data collector may receive network data as data feeds, e.g., SMTP, HTTP and FTP feeds. Data collector may assemble events and content from the received network data, block 204. As noted above, events may include content (e.g., files). Additionally, embodiments may permit the uploading of content (e.g., files), e.g., through a GUI/CLI-based collector for manual file upload or a file-based API collector, block 206. The events and contents are converted into data messages, block 208. The messages may include metadata that identifies the events and content contained therein. The messages are routed to one or more of a plurality of analyzers in the characterization sensor 12 based on each analyzer's one or more subscriptions, block 210. The analyzers' subscriptions may be defined by specified message criteria. If a given message meets the specified message criteria of an analyzer's subscription, e.g., determined by comparing the specified criteria to the metadata contained in the message, that message will be routed to the analyzer. As noted above, each analyzer may subscribe to one or more types of messages and in embodiments of method 20, multiple analyzers may subscribe to the same type of message.

Routing the messages 210 may also be based on resource allocation, processing time and load. For example, embodiments may configure a plurality of characterization sensors 12 in a peer-to-peer grid, as described below. As such, routing 210 may consider the current load of a given characterization sensor and may route messages 210 in a different characterization sensor to better balance the processing load.

When the analyzers receive their subscribed-to, routed data messages, the analyzers may analyze the content contained within the data messages per their specific analysis algorithms and techniques and generate characterization results based on the analysis, block 212. Characterization results may include metadata describing the analysis and the characterization results and content (e.g., files) that have been analyzed. Analyzed files may be tagged with, e.g., metadata, indications of whether the file is malicious, benign or a percentage indicating a likelihood that the file is malicious. As noted above, embodiments include a plurality of analyzers, including proprietary, third-party and/or open-source analyzers. Embodiments include machine-learning analyzers such as Hector and hURI as described above. The characterization results of the plurality of analyzers may be collected, combined and output, e.g., from the scalable file analyzer, for visualization in a system GUI or other subsequent action based on criteria and thresholds, block 214. Characterization results may include, e.g., a flag or other indication indicating the analyzer considered a file to be malicious or a percentage likelihood that the file is malicious. Outputting 214 may include storing the characterization metadata in a database and the classified files on disk space. Outputting 214 may include additional processing of the characterization results so that the combined characterization results may be presented in a useful manner to a user (e.g., through GUIs described herein).

With continuing reference to FIG. 2, the characterization results may be compared with criteria and thresholds, block 216. The criteria and thresholds may be modified and set based on the needs and demands of an enterprise or other user of the system. The criteria, if met, may dictate what subsequent action to take while thresholds may dictate whether analyzed content meets a threshold for being considered malicious. For example, if the characterization results indicate that Hector considers a file to be sixty-five percent (65%) likely to be malicious and an enterprise user has set fifty percent (50%) as the threshold and criteria for flagging a file as malicious, flagging a file for inclusion in the enterprises further review results listing, including the file in the system's GUI visualization, instructing further action, etc., then the system will take the indicated action(s). Consequently, method 20 will visualize and/or take other action based on the comparison 216, block 218.

As noted, the criteria and thresholds for visualization may be tunable. I.e., the criteria and thresholds may be modified and set by users. In embodiments of the characterization sensors, criteria and thresholds may be set to default levels, e.g., based on an understanding of an enterprise or other user's security sensitivities. For example, the more risk adverse an enterprise, the lower a threshold may be set for a file to be flagged, listed and visualized as malicious. Enterprise and other users may adjust or tune these settings based on the results of their initial or subsequent settings. For example, if too many files are being flagged and visualized for effective subsequent review, the criteria and thresholds for such flagging and visualization may be raised. Consequently, method 20 may determine if a user is setting changes to criteria and/or thresholds, block 220. If changes are set, method 20 receives the changes to criteria and/or thresholds, block 222, and processes these changes, block 224. The processing 224 effectuates the changes and may cause system to re-compare characterization results to criteria and thresholds 216 and visualize and/or take other action based on the re-comparison 218. If no changes are made to the criteria and/or thresholds, method 20 continues to receive network data 202 and characterize or classify as described above.

Figure 3:
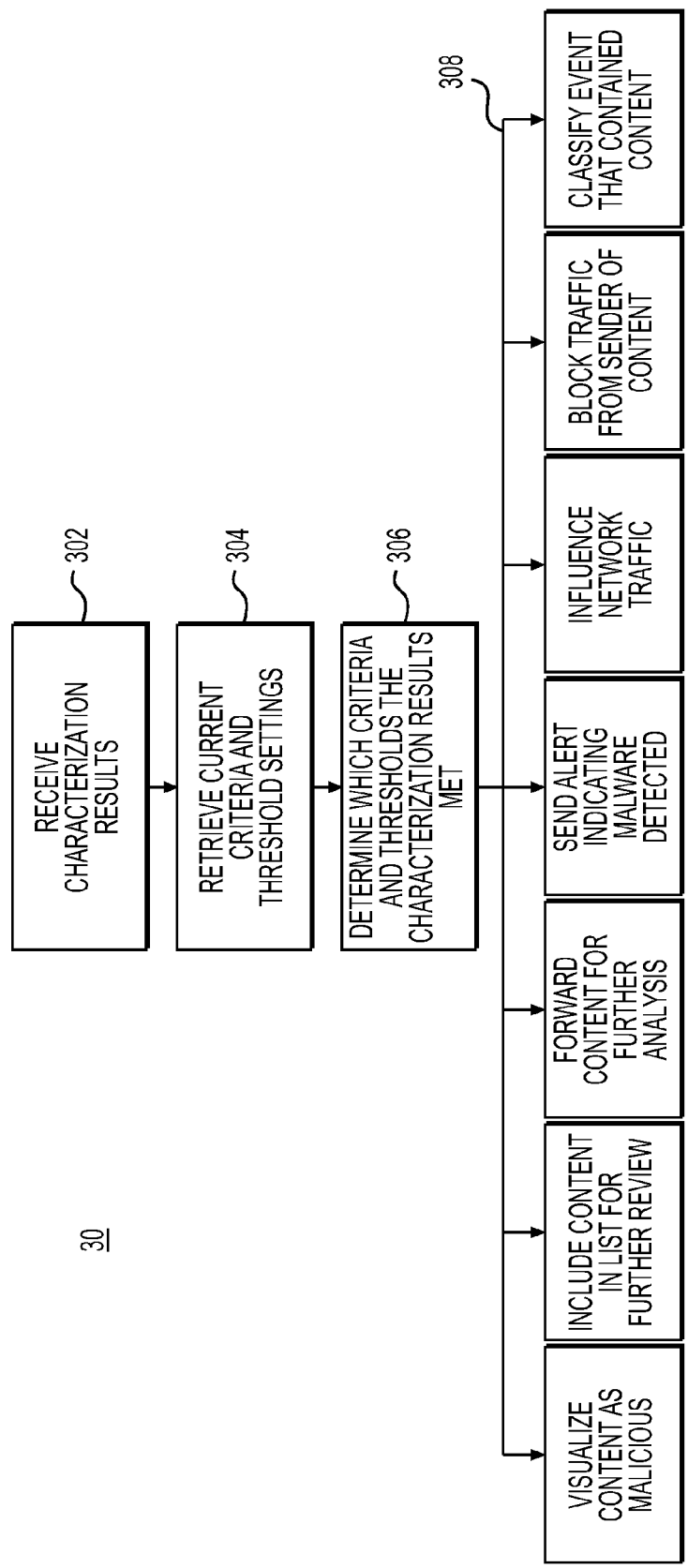
FIG. 3 is a flowchart illustrating an embodiment of a method for network data characterization.

With reference now to FIG. 3, shown are processes illustrating in greater detail how an embodiment of a method 30 for network data characterization processes characterization results. The processes shown illustrate how an embodiment of method 30 may compare characterization results with criteria and thresholds (see, e.g., block 216) and visualize and/or take other action based on the comparison (see, e.g., block 218). Method 30 may receive the characterization results from the analyzers (e.g., from scalable file analyzer), block 302. The current criteria and threshold settings may be retrieved, block 304. Method 30 may determine which criteria and thresholds are met, block 306, for example by comparing metadata in the characterization results to the criteria and/or thresholds. Method 30 may then take any one or more of a variety of actions based on the determination 306, block 308. FIG. 3 illustrates examples of the actions that embodiments may take 308. Note, further analysis may be conducted by external analyzers.

Figure 4A:
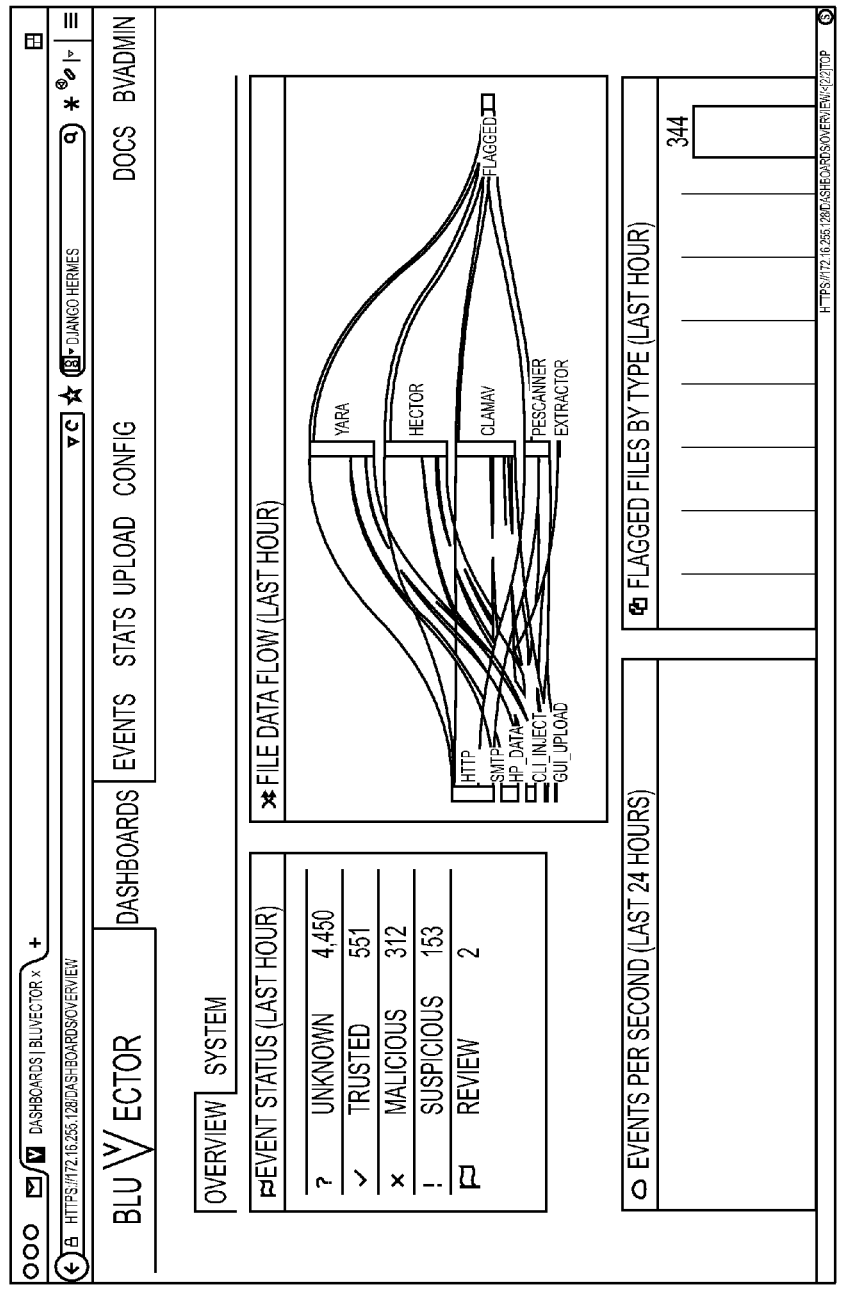
FIGS. 4A-4B is a screen-shot of a dashboard illustrating characterization results of an embodiment of a system and method for network data characterization.
Figure 4B:
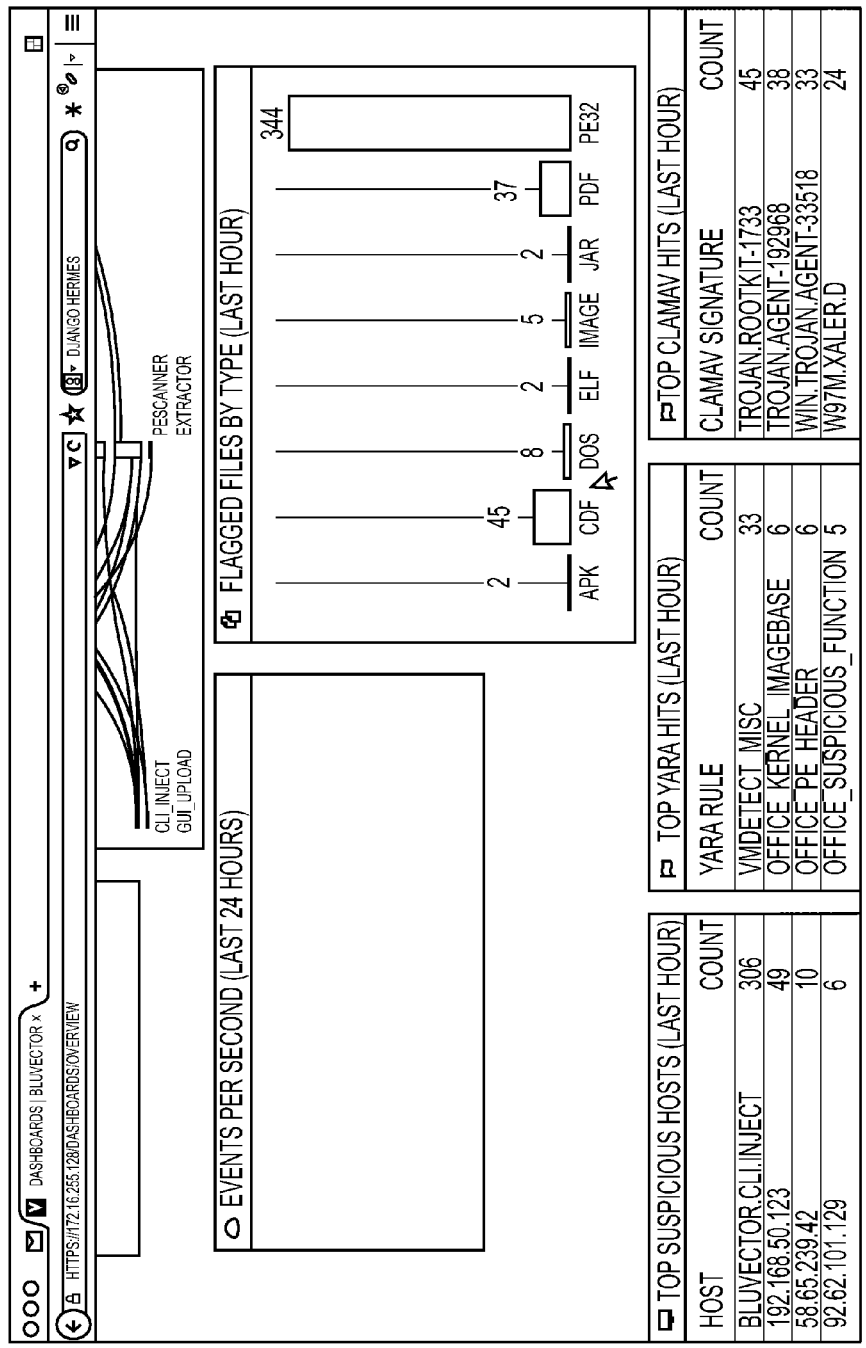

With reference now to FIG. 4A and FIG. 4B, shown is a screen shot of a dashboard visualization GUI 40 depicting a visualization of characterization results generated by an embodiment of a system and method for network data characterization. As shown in FIG. 4A, dashboard visualization GUI 40 may provide an indication of the characterization status of events received within a certain period of time (e.g., in the preceding hour). The characterization status may be, for example, unknown, trusted, malicious, suspicious, or subject to further review. Dashboard visualization GUI 40 may also include a depiction of the file data flow within a certain period of time (e.g., in the preceding hour). The file data flow may illustrate the volume of file source types received with the period of time, e.g., HTTP, SMTP, FTP, CLI injected files and GUI uploaded files. The flow also may illustrate the analyzers that have analyzed the received content and the volume of files subscribed to, received and analyzed by each analyzer. The dashboard visualization GUI 40 also illustrates the volume of analyzed files classified by the various analyzers as malicious or likely malicious (e.g., flagged).

With reference now to FIG. 4B, dashboard GUI 40 may illustrate the number of files, by type of file, considered to be malicious or likely malicious (flagged) within a certain period of time. Likewise, dashboard GUI 40 may provide a ranked list of sources (referred to as hosts here) of malicious or likely malicious events (e.g., suspicious hosts) with a certain period of time. The ranked list may be ranked by number of malicious or likely malicious events received from the host or source. Likewise, dashboard GUI 40 may provide other ranked lists, such as a ranked list of files flagged as malicious or likely malicious by analyzer (e.g., Yara, ClamAV, Hector, etc.) or by all analyzers. The characterization results and other data depicted on dashboard GUI may be determined by the criteria and thresholds set as described above and is configurable by the enterprise or other user.

Figure 5:
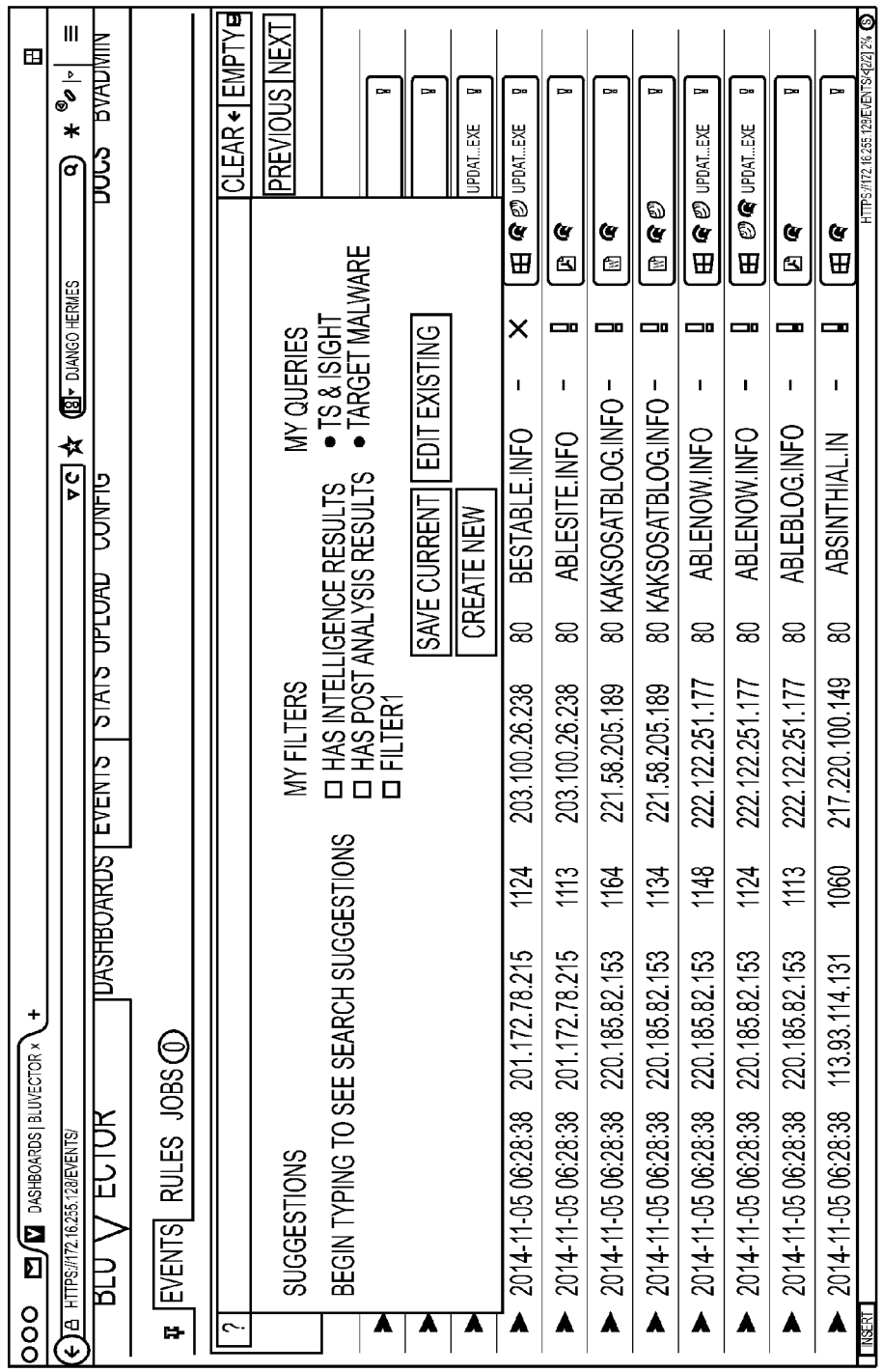
FIG. 5 is a screen-shot of an classified event listing illustrating characterization results of an embodiment of a system and method for network data characterization.

With reference now to FIG. 5, shown is characterization results visualization GUI 50 that lists events that have been classified (as containing malicious, suspicious or content needing further review) by an embodiment of a system and method for network data characterization. Characterization results visualization GUI 50 may include, for each file so classified, a date and time stamp for when classified, the source IP address, the recipient or target IP address, the host name (or IP address), a graphical indication of whether malicious (e.g., a red X), suspicious (e.g., a, orange exclamation point) or subject to further review (e.g., a blue flag) and a graphical representation of the analysis/characterization results (e.g., a graphical indication of the type of file (e.g., Windows, Word, MS-DOS, etc.) and which analyzer or analyzers classified the content as malicious or suspicious (e.g., an icon indicating the analyzer) and, if known, the malware file name). In an implementation, the content listed and displayed on the characterization results visualization GUI 50 are meant to be further considered or analyzed by the enterprise or other user. Consequently, the user may want to further filter the results.

One of the benefits of embodiments of the system and method for network data characterization described herein, and the analyzers utilized, such as Hector, is that the risk of false negatives are minimized. A false negative means that an event or file that is malicious is falsely classified as benign. Unfortunately, the embodiments described herein, including Hector, are so effective that sometimes too many detected events are generated. Users need to have tools to manage the results so as to be able to effectively review these results. As shown, characterization results visualization GUI 50 may provide a filter tool that enables the user to filter the results displayed by characterization results visualization GUI 50 with a variety of filters. For example, characterization results visualization GUI 50 may filter results by file name, file type, source IP address, host name, target IP address, time classified, analyzer characterization or classification, the cryptographic hash function of the file name (e.g., a secure hash algorithm (SHA)-256 hash of the file name), file size, etc. These filters enable a user to better manage the results.

Figure 6:
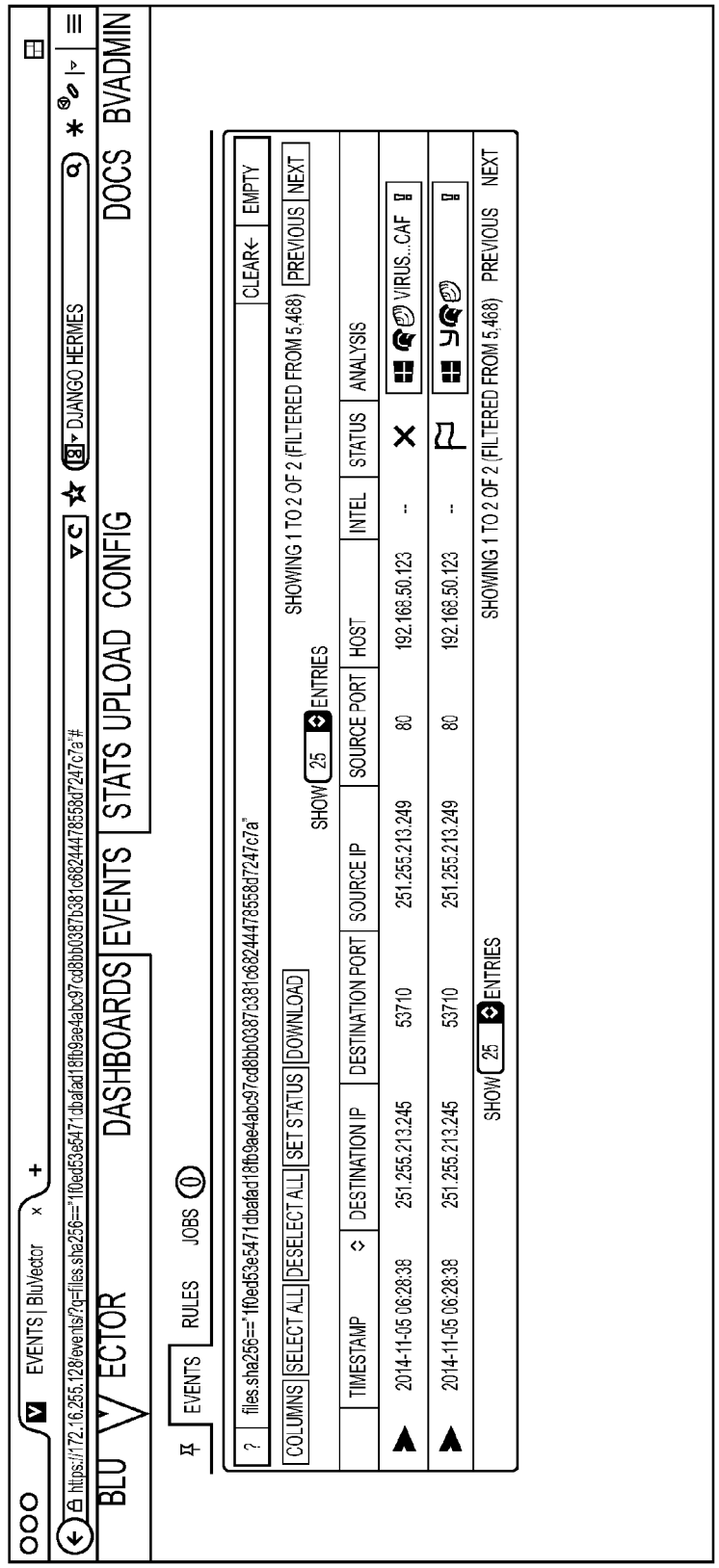
FIG. 6 is a screen-shot of an classified event listing illustrating filtered characterization results of an embodiment of a system and method for network data characterization.

With reference now to FIG. 6, shown is a characterization or classification results visualization GUI 60 with filtered results. The characterization results shown have been filtered by a SHA-256 hash of a file name. In other words, only those characterization results that have the same SHA-256 hash are listed. As shown, the time/date stamp, destination or target IP address, the destination port, the source IP address, the source port, host name (host name is a name for the source that may be derived from the raw network data packet), whether additional research intelligence regarding file is available, the status (malicious, suspicious, subject to further review) and a graphical representation of the analysis/characterization results. The characterization results may be sorted by all of these categories.

Figure 7A:
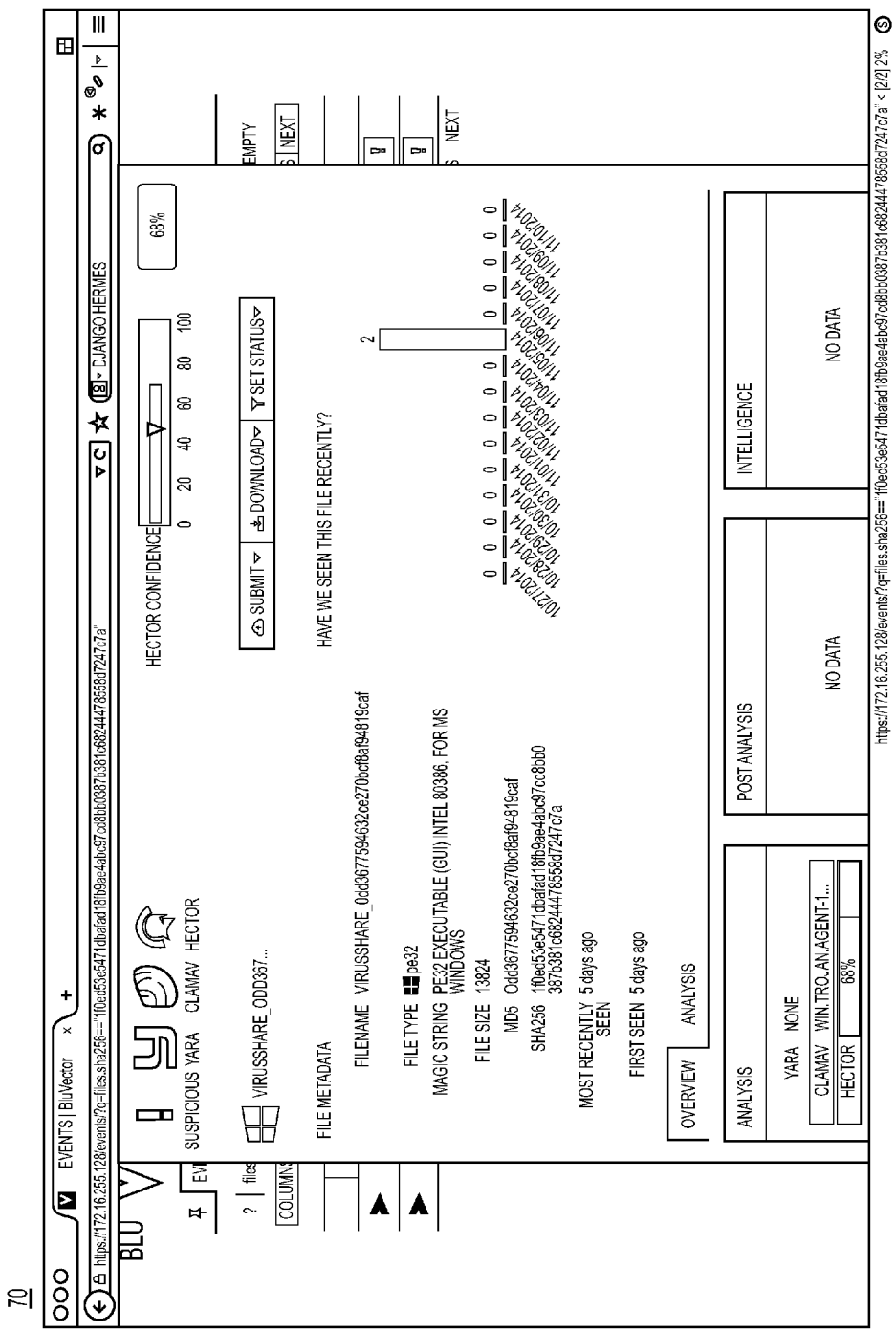
Figure 7B:
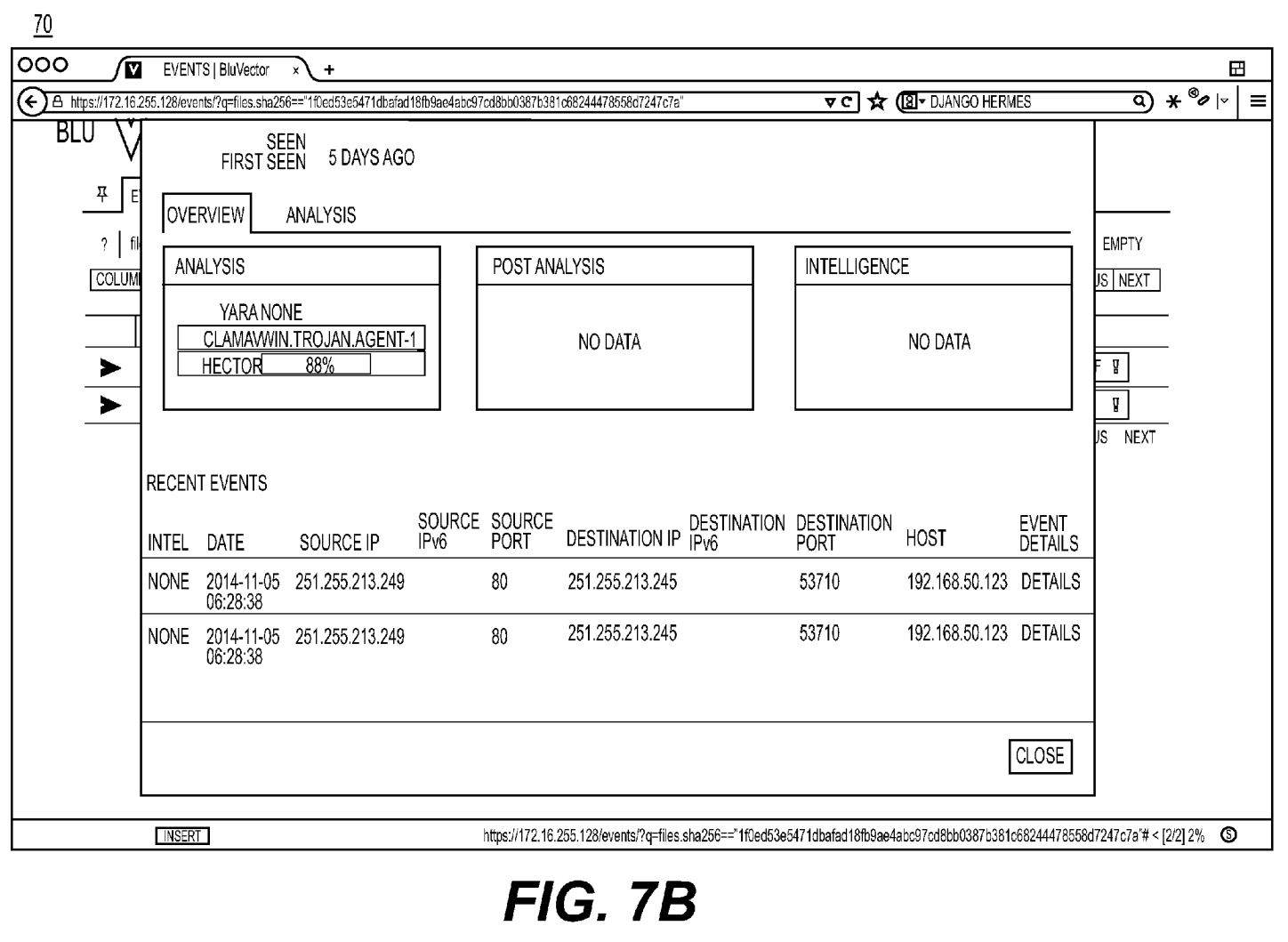

With reference now to FIGS. 7A-7B, shown is classified or characterized file detail visualization GUI 70. Any of the results shown in characterization results visualization GUI 60 may be selected to view classified file detail visualization GUI 70. Characterized file detail visualization GUI 70 depicts additional details of a classified file and provides options for further actions to be selected by the user. For example, the details may include the analyzers that classified the file as malicious or suspicious, the Hector confidence percentage (e.g., shown on a bar graph with an indication of the threshold confidence level set by the enterprise or other user), file metadata (e.g., including file name, file type, a string of relevant details ("Magic String"), file size, cryptographic hashes of the file (e.g., MD5 and SHA-256 hashes), when the classified file was most recently seen and first seen), a bar graph indicating frequency of the file being detected over recent days, action choices such as submitting the file for, e.g., further review (internally or externally), quarantine, deletion, etc., downloading of the file details, setting status of the file review by the user), an overview of the analysis results indicating the applicable analyzers (i.e., the analyzers that subscribed to the message containing the classified file) and their characterization result (e.g., none (Yara), identification of malware name (ClamAV), or confidence percentage (Hector)), data on post analysis and other intelligence, if any, and a listing of recent events containing the classified file.

Figure 8:
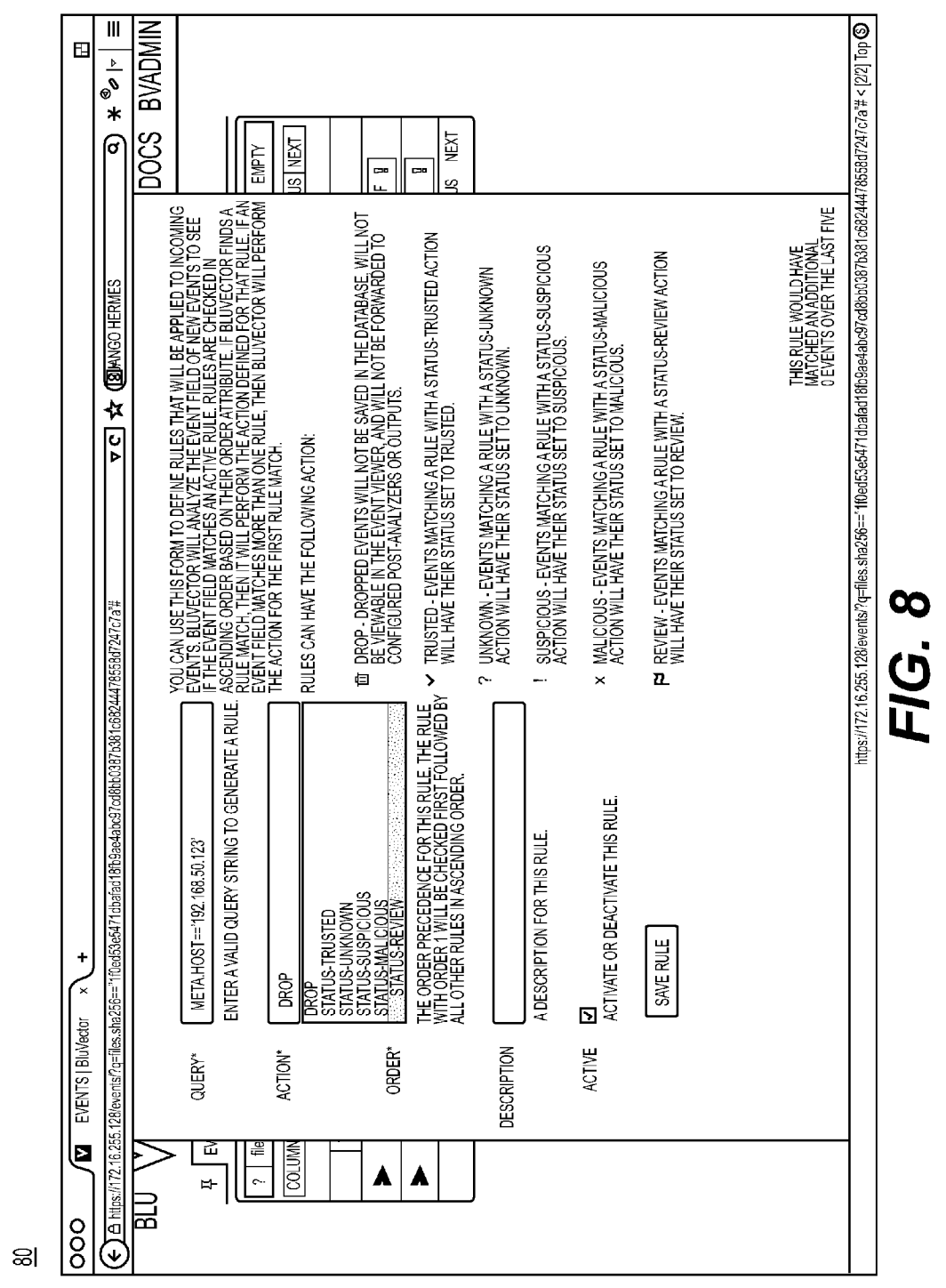

With reference to FIG. 8, shown is a rule setting GUI 80. Rules are another tool that a user may use to manage characterization or classification results. By selecting, e.g., the Rules tab shown on FIGS. 5 and 6, a user may define rules that specify how certain characterization results are treated, including what actions are taken. For example, a user may input a query string that the rule as applying to any classified events, e.g., from a certain host or source IP address, addressed to a certain target IP address, containing certain file names, with a Hector confidence level above a certain percent, etc. The user may define a certain type of action taken, such as dropping events that match the query or setting the status of the event as trusted, unknown, suspicious, malicious, or subject to further review. Embodiments also immediately process the rule and indicate on rule setting GUI 80 the number of events the new rule would have matched over a certain period of time (e.g., the previous five days) so that the user may see the immediate impact of the rule.

Another tool that embodiments of the method and system for network data characterization provide is the ability to pinpoint results. With reference now to FIGS. 9A-9E, shown is a characterization results visualization GUI with a pinpoint tool 90. Pinpoint tool enables a user to select a time frame (e.g., time and date range) of classified events for display, sort the results by how classified in descending/ascending order, limit the results displayed, filter the results by various metadata (see above), and group the results by, e.g., host, input-source type, file type, application type, how classified (flags), domain name, location, time, whether the file is a 'signed' file (i.e., signed with a certificate from a 'trusted' authority), etc. or by any metadata or characteristic of or included in the characterization results. The pinpoint tool provides literally hundreds of choices of characterization results metadata and characteristics of the classified events and content that may be used to pinpoint, group and sort the results. In effect, the pinpoint tool 90 is a tool for presenting analyzer results workflow.

Figure 9A:
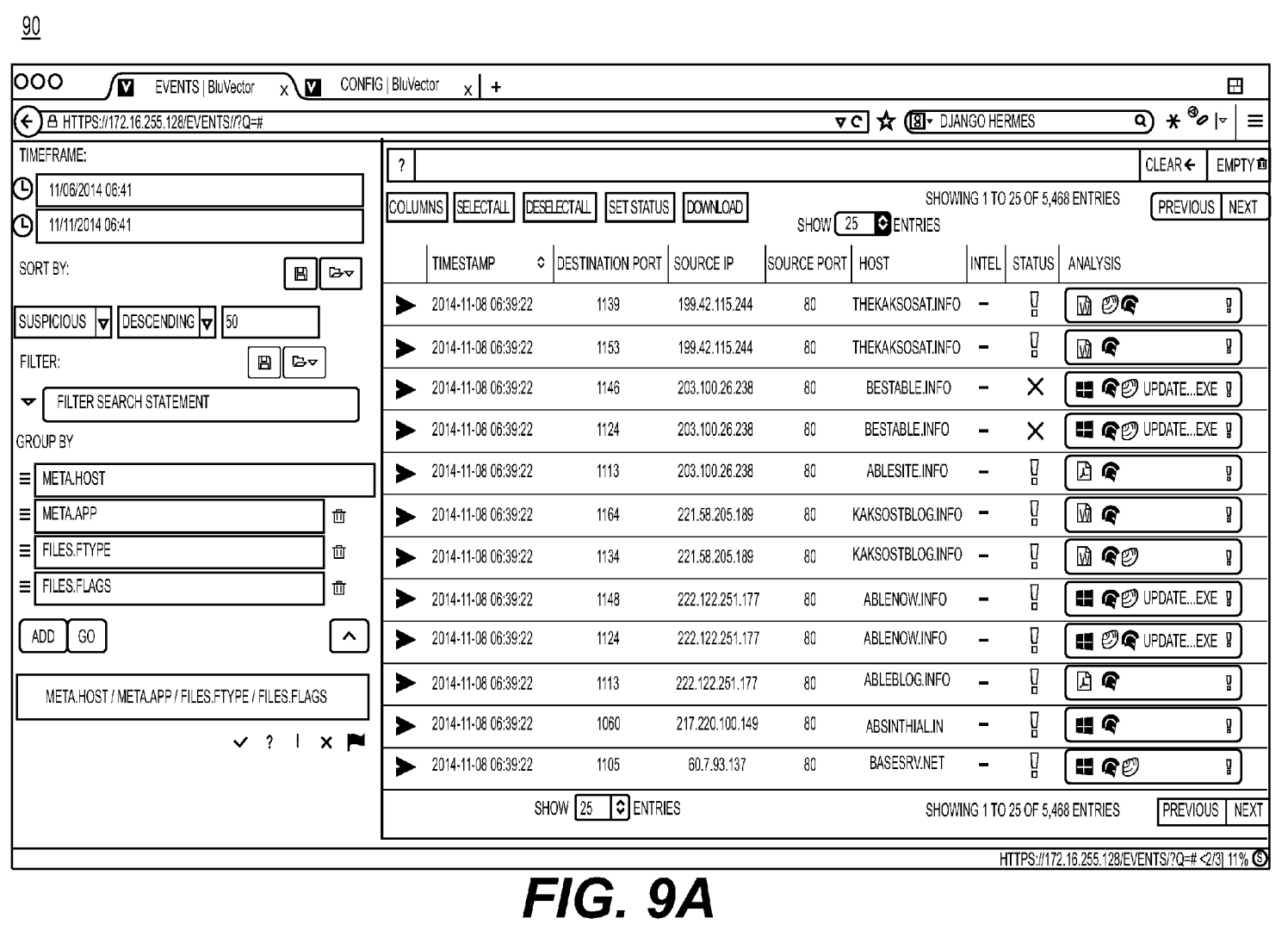
Figure 9B:
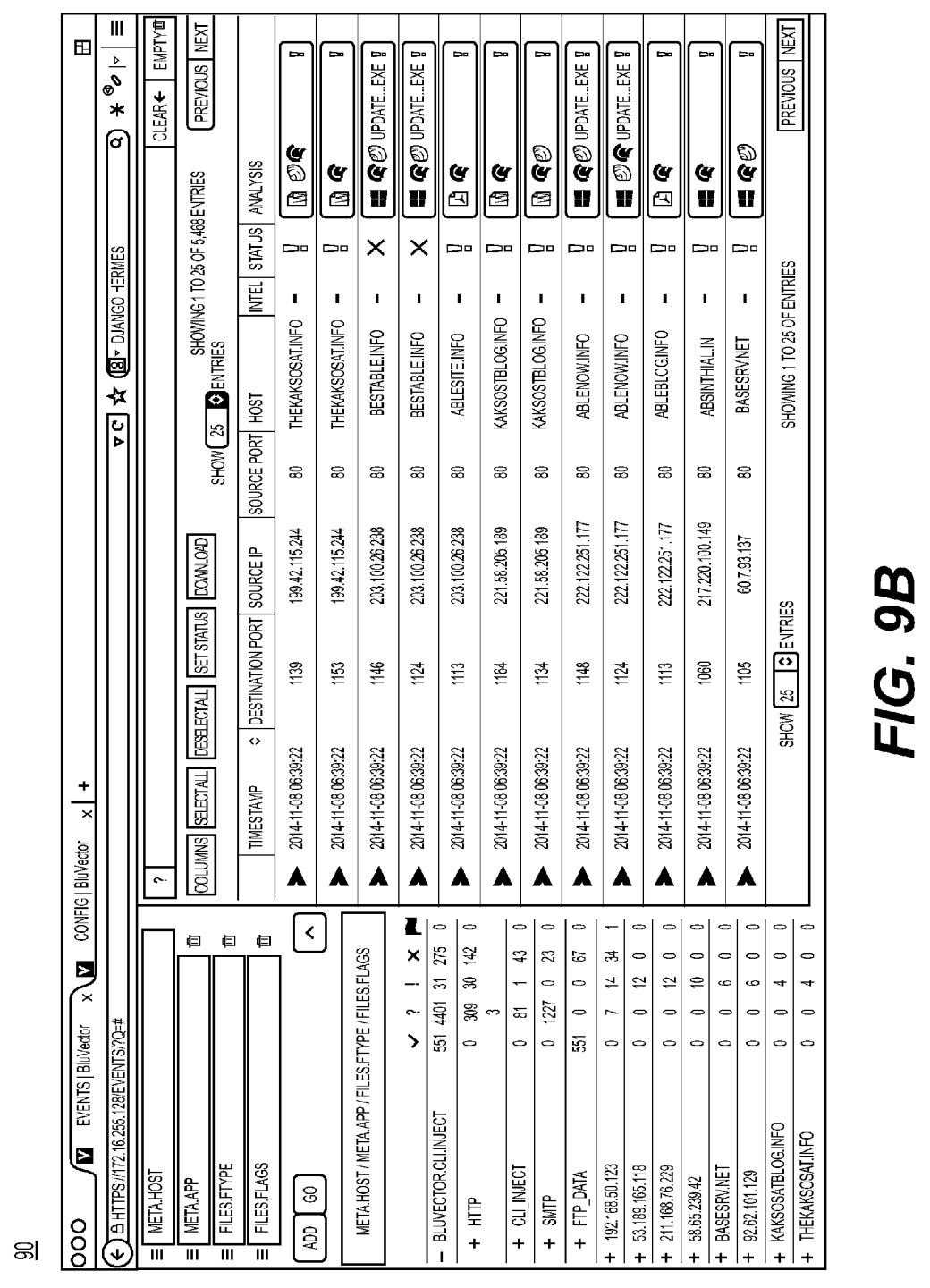
Figure 9C:
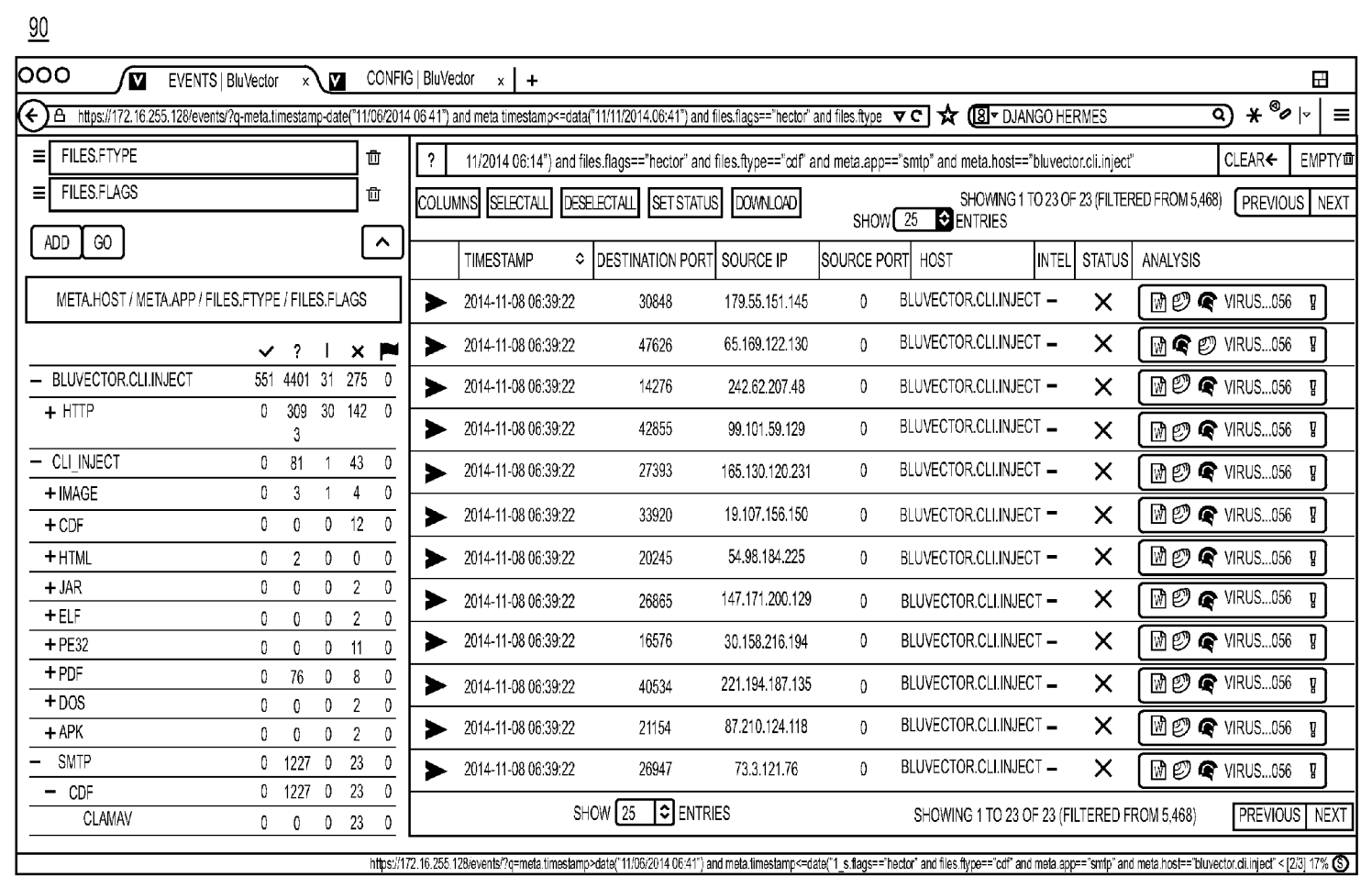

The event characterization results listed on the characterization results visualization GUI are filtered and listed based on the pinpoint tool 90 selections. Furthermore, the pinpoint tool 90, when run, lists the results of the pinpoint selections. For example, as shown in FIG. 9B, pinpoint tool lists the number of events classified as detected by host and shows how those events were classified (by appropriate flags). In the example shown, the host with the most characterization results is bluvector.cli.inject. That host has 551 events flagged as benign, 4401 events flagged as unknown, 31 events flagged as suspicious and 275 events flagged as malicious. A user can expand the pinpoint results list, as shown, e.g., under a given host, to show the input source type of the flagged events, e.g., HTTP, CLI_INJECT, SMTP, and FTP. Likewise, as shown in FIG. 9C, the user can expand the pinpoint results list, e.g., under a given input source type, to show the file type (e.g., image file, cdf, html, jar, elf, pe32, pdf, dos, apk, etc.). Likewise, as shown, the user can expand the pinpoint results list, e.g., under a given file type, to show the analyzer that classified the file (e.g., ClamAV, Hector, Yara, etc.). As shown in FIG. 9D, the pinpoint tool allows the user to change the grouping order so that a different category is used as the primary grouping. For example, the input-source type (e.g., meta.app) may be used as the primary grouping, and the input-source types (e.g., http, null, cli_inject, gui_upload, smtp, ftp) expanded to obtain the other information.

As stated above, the pinpoint tool 90 may pinpoint results based on any of the metadata provided with the characterization results by the analyzers. With reference to FIG. 9E, shown is a pinpoint tool 90 configured to group results based on the language used in the file. While analyzers cannot always determine the language used, if the language can be determine, embodiments of the method and system for network data characterization can filter and group results based on language. For example, as shown, results using English, Russian or Chinese may be displayed. Unknown language results may be grouped as neutral. This is particularly useful when an enterprise is aware of or concerned primarily with threats originating from certain countries or regions. Pinpoint tool may also filter and group by results that include a certain signature (i.e., a previously identified malware signature detected, e.g., by the PEScanner) or that were detected by a certain analyzer only.

Figure 10:
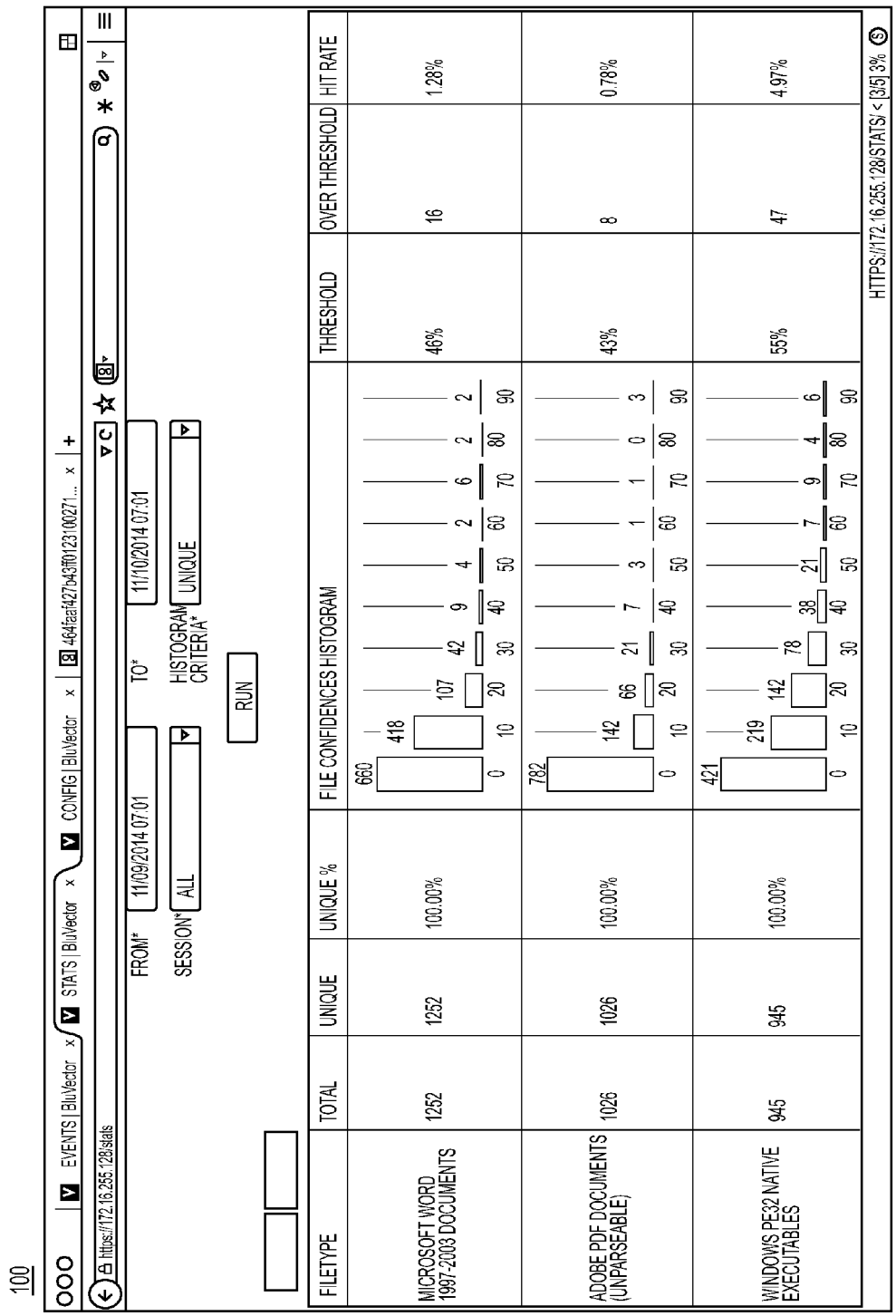
FIG. 10 is a screen-shot of confidence percentage results of characterization result file types of an embodiment of a system and method for network data characterization.

One of the most powerful aspects of embodiments of the method and system for network data characterization is that they greatly increase the usefulness and effectiveness of results of machine-learning analyzers (e.g., such as Hector). With reference to FIG. 10, shown is a characterization confidence GUI 100 that sorts classified files by file type and displays histograms indicating the number of files of that type classified in various characterization confidence percentage ranges by a machine learning analyzer. To refresh, the confidence percentage is the percent confidence that the file is malicious, as determined by the machine learning analyzer. Confidence GUI 100 also indicates the set threshold for each file type, the number of files for that file type that had a confidence percentage above the threshold and the hit rate percentage (percentage of files over confidence percentage divided by total number of files of file type). The confidence GUI 100 is helpful for a user to visualize the number and percentage of results and to determine whether a threshold is too high or too low.

Figure 11A:
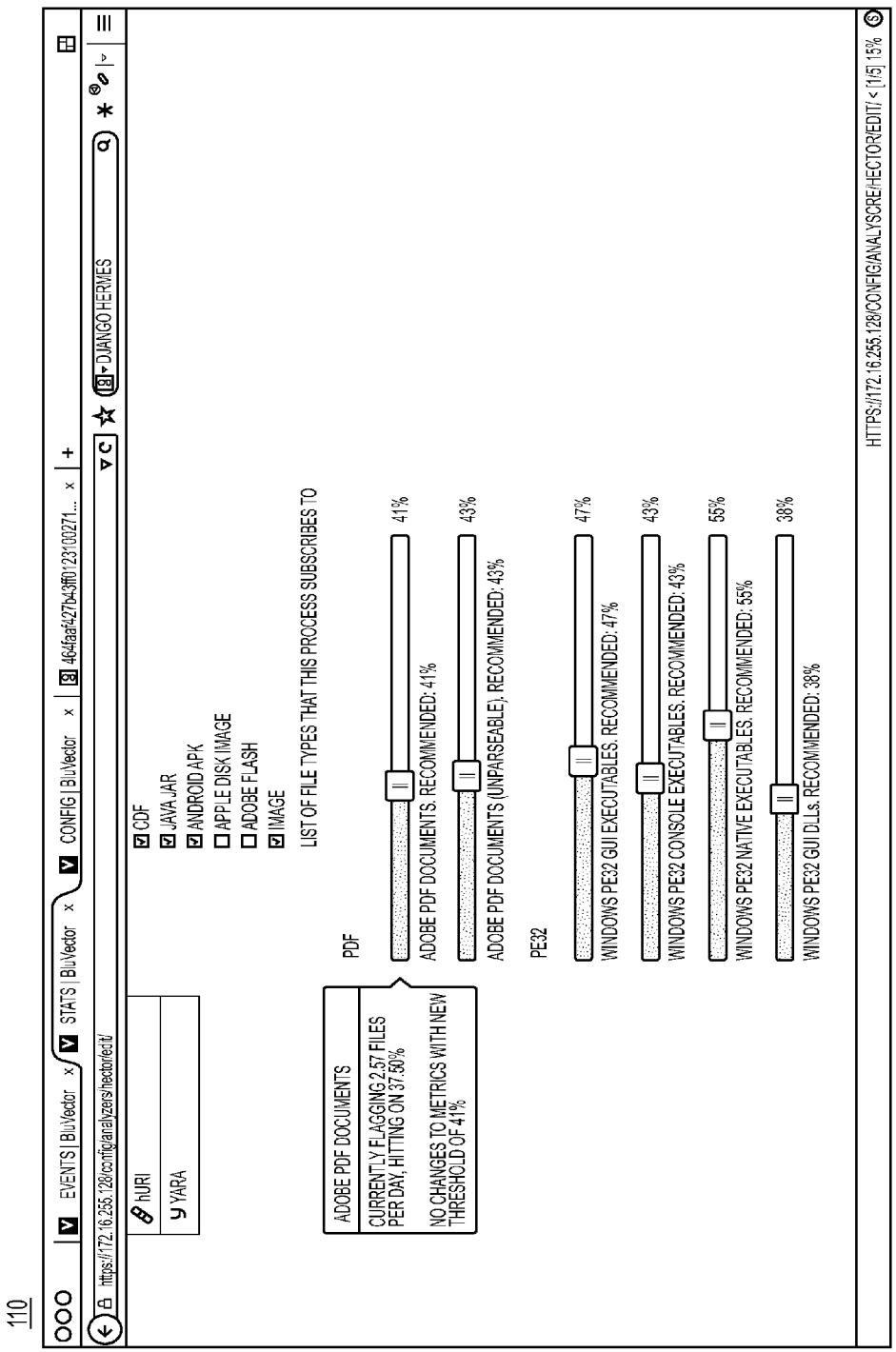
FIGS. 11A and 11B are screen shots of a configuration tool of an embodiment of a system and method for network data characterization.
Figure 11B:
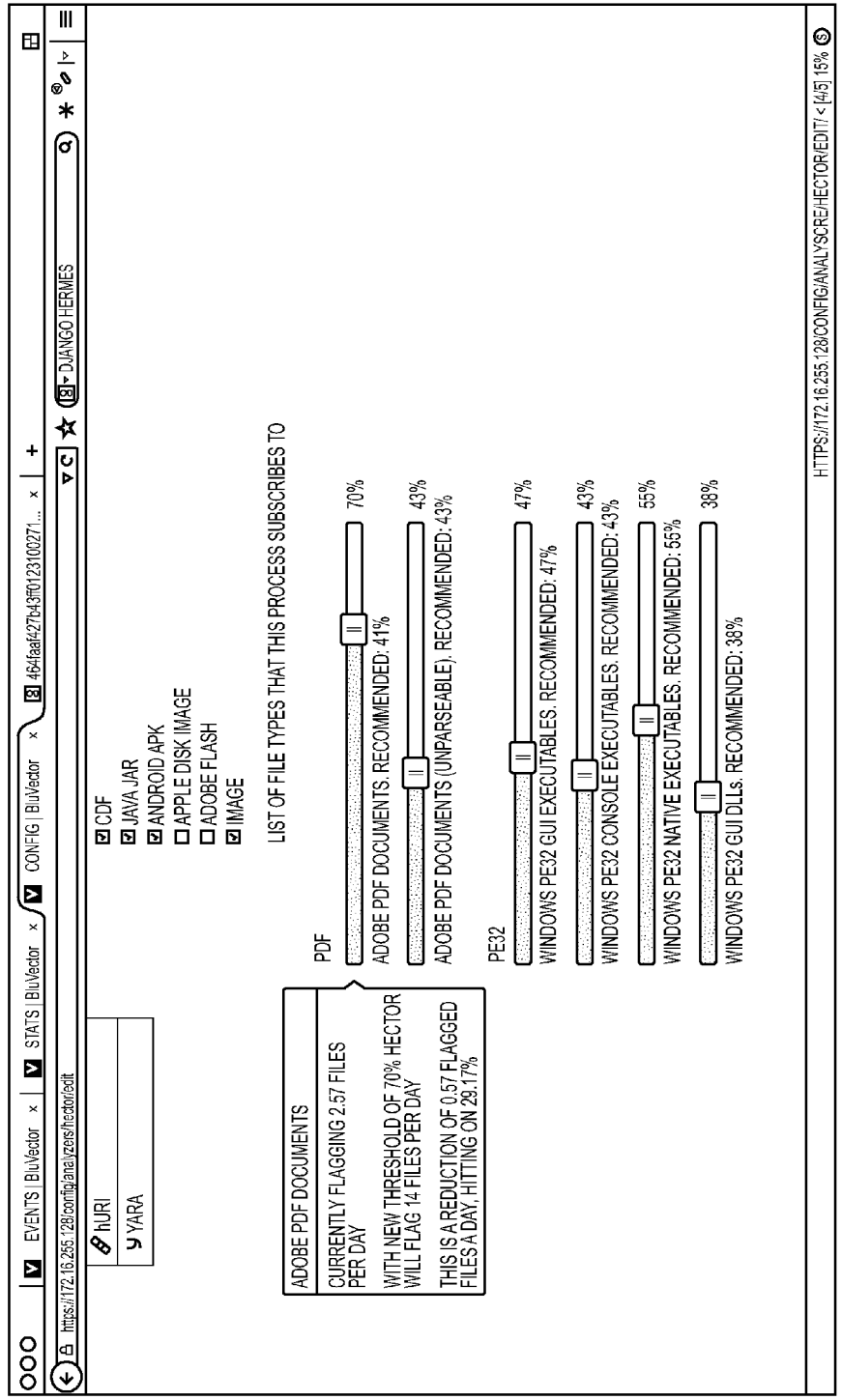

With reference now to FIGS. 11A-11B, shown is a configuration GUI 110 for setting confidence percentage thresholds by file type. As shown, thresholds may be set on a slider bar. Embodiments provide a recommended threshold configuration for each file type. This recommended threshold configuration may be determined by the machine-learning analyzer. For example, post-analysis results may be fed back to machine-learning analyzers that indicate the confidence percentage of later, separately confirmed malware. These results may be used by embodiments to set the recommended thresholds. This ability to set different configurations, thresholds and otherwise manage the visualization of analyzer results makes it very easy to tune the system to the analyst's workload capacity. As shown in FIG. 11A, configuration GUI 110 may indicate the number of files flagged per day using the current threshold configuration as well as the percentage of files of the given type being flagged as over the threshold percentage. If a threshold percentage configuration is changed, configuration GUI 110 may indicate the predicted number of files that will flagged per day using the new threshold configuration as well as the percentage of files of the given type being flagged as over the new threshold percentage, as shown in FIG. 11B. This information may allow the user to determine what threshold percentage is useful for the user's enterprise. As can also be seen in FIGS. 11A-11B, a user may also select or deselect file types to which an analyzer subscribes on configuration GUI 110. These selections will determine which file types are routed to the analyzers of that type (see FIGS. 1-2 above).

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. A computer-implemented method for network data characterization, comprising:
   receiving a network event and related content;
   creating a data message comprising the content and metadata describing the content and the related event;
   routing the data message to a plurality of analyzers based on the metadata and one or more subscriptions associated with the plurality of analyzers, wherein the plurality of analyzers include at least one machine-learning analyzer;
   receiving the routed data message and analyzing the content therein to generate characterization results comprising a content classification and an associated confidence percentage;
   outputting the characterization results of the plurality of analyzers; and
   comparing the output characterization results against a plurality of criteria to determine subsequent action to take based on the characterization results, wherein:
      the characterization results include metadata describing one or more of the following: at least one of the plurality of analyzers, the classified content, and the characterization results; and
      the subscriptions associated with one of the plurality of analyzers includes at least one message type not included in the subscriptions associated with a different one of the plurality of analyzers.

2. The method of claim 1 wherein receiving network events includes receiving network data from one or more network data feeds, including HTTP, FTP and SMTP data feeds.

3. The method of claim 2 further comprising re-assembling the network data into events and content.

4. The method of claim 1 wherein receiving a network events includes receiving content from a command line interface or graphical user interface upload.

5. The method of claim 1 wherein the associated confidence percentage indicates the probability that the content is malign or the confidence that a prediction that the content is malign is correct.

6. The method of claim 1 wherein outputting includes combining the characterization results of the one or more analyzers.

7. The method of claim 1 wherein outputting includes tagging the classified content with tags indicating that the content is malicious, suspicious, benign, unknown or needs further review.

8. The method of claim 7 wherein outputting includes storing the classified, tagged content on a disk.

9. The method of claim 1 wherein outputting includes storing the characterization metadata in a database.

10. The method of claim 1 wherein the subsequent action includes storing the classified content and characterization metadata, modifying network traffic, or forwarding said classified content to external analyzers.

11. The method of claim 1 wherein the one or more subscriptions include at least one of file type, event source, or event destination.

12. The method of claim 1 wherein the machine-learning analyzer utilizes feature-based processing to determine the confidence percentage based on a comparison of features of the content and a classifier derived from features of known malicious and known benign files.

13. The method of claim 1 wherein the routing is further based on resource allocation factors.

14. The method of claim 1 further comprising generating a visualization of the characterization results.

15. The method of claim 14 wherein the visualization is generated based on one or more criteria or thresholds pertaining to the number of events classified as suspicious and requiring the user's attention.

16. The method of claim 15, wherein the one or more criteria or thresholds are user-configurable.

17. The method of claim 16 further comprising presenting a prediction of future characterization results based on the change to the one or more threshold levels or other criteria.

18. A sensor for network data characterization, comprising:
  one or more processors; and
  at least one memory including instructions for execution by the one or more processors that configure the sensor to:
    receive a network event and related content;
    create a data message comprising the content and metadata describing the content and the related event;
    route the data message to a plurality of analyzers based on the metadata and one or more subscriptions associated with the plurality of analyzers, wherein the plurality of analyzers include at least one machine-learning analyzer;
    receive the routed data message and analyze the content therein to generate characterization results comprising a content classification and an associated confidence percentage;
    output the characterization results of the plurality of analyzers; and
    compare the output characterization results against a plurality of criteria to determine subsequent action to take based on the characterization results, wherein:
      the characterization results include metadata describing one or more of the following: at least one of the plurality of analyzers, the classified content, and the characterization results; and
    the subscriptions associated with one of the plurality of analyzers includes at least one message type not included in the subscriptions associated with a different one of the plurality of analyzers.

19. The sensor of claim 18 wherein the associated confidence percentage that indicates the probability that the content is malign or the confidence that a prediction that the content is malign is correct.

20. The sensor of claim 18 further comprising one or more interfaces connected to an external network external to an enterprise hosting the one or more characterization sensors and an internal network that is an enterprise internal network.

* * * * *